(12) United States Patent
Chen et al.

(10) Patent No.: US 11,762,774 B2
(45) Date of Patent: Sep. 19, 2023

(54) ARITHMETIC PROCESSOR AND METHOD FOR OPERATING ARITHMETIC PROCESSOR

(71) Applicant: FUJITSU LIMITED, Kawasaki (JP)

(72) Inventors: Junlu Chen, Kawasaki (JP); Toru Hikichi, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 17/725,589

(22) Filed: Apr. 21, 2022

(65) Prior Publication Data

US 2023/0010353 A1 Jan. 12, 2023

(30) Foreign Application Priority Data

Jul. 12, 2021 (JP) .................................. 2021-115306

(51) Int. Cl.
*G06F 12/00* (2006.01)
*G06F 12/084* (2016.01)
*G06F 9/30* (2018.01)
*G06F 12/0875* (2016.01)

(52) U.S. Cl.
CPC .......... *G06F 12/084* (2013.01); *G06F 9/3001* (2013.01); *G06F 12/0875* (2013.01); *G06F 2212/452* (2013.01)

(58) Field of Classification Search
CPC .. G06F 12/084; G06F 9/3001; G06F 12/0875; G06F 2212/452; G06F 12/0857; G06F 12/0831; G06F 2212/1008; G06F 2212/1024; G06F 12/0813; G06F 12/082; G06F 12/0895; G06F 2212/621; G06F 12/0811
See application file for complete search history.

(56) References Cited

U.S. PATENT DOCUMENTS

| 2014/0006716 | A1* | 1/2014 | Steeley, Jr. ........... G06F 15/167 711/130 |
| 2022/0197803 | A1* | 6/2022 | Gupta ................. G06F 12/0891 |

FOREIGN PATENT DOCUMENTS

| JP | H07-121308 A | 5/1995 |
| JP | H11-167557 A | 6/1999 |

* cited by examiner

*Primary Examiner* — Arvind Talukdar
(74) *Attorney, Agent, or Firm* — Fujitsu Patent Center

(57) ABSTRACT

An arithmetic processor including a plurality of core groups each including a plurality of cores and a cache unit, a plurality of home agents each including a tag directory and a store command queue and a store command queue. The store command queue enters the received store request to the entry queue in order of reception, the cache unit stores the data of the store request in a data RAM. The store command queue sets a data ownership acquisition flag of the store request to valid when obtaining a data ownership of the store request and issues a top-of-queue notification to the cache control unit when the flag of the top-of-queue entry is valid. In response to the top-of-queue notification, the cache unit update a cache tag to modified state and issue a store request completion notification.

9 Claims, 17 Drawing Sheets

CMG0 or CMG1

FIG. 13

ENTRY QUE_REG. in STDQ

| | VALID | REQ_ID | MIPTKN | |
|---|---|---|---|---|
| 0 | VALID | A | 1 | TOQ |
| 1 | VALID | B | 0 | TOQ |
| 2 | VALID | C | 1 | |
| 3 | VALID | D | 1 | |

- MIPTKN NOTIFICATION WAIT
- SNOOP REQUEST TARGET
- SNOOP REQUEST TARGET

ODP

| | VALID | OD_ID | REQUEST CONTENT |
|---|---|---|---|
| 0 | VALID | K | SNOOP REQUEST |
| 1 | VALID | L | SNOOP REQUEST |

← ODR_VC

ARITHMETIC PROCESSOR AND METHOD FOR OPERATING ARITHMETIC PROCESSOR

CROSS-REFERENCE TO RELATED APPLICATION

This application is based upon and claims the benefit of priority of the prior Japanese Patent Application No. 2021-115306, filed on Jul. 12, 2021, the entire contents of which are incorporated herein by reference.

FIELD

The present invention relates to an arithmetic processor and a method for operating the arithmetic processor.

BACKGROUND

An arithmetic processor is a central processing unit (CPU) chip or a processor. The arithmetic processor will hereafter be referred to as a processor. The processor includes a plurality of processor cores or cores. The processor also includes a plurality of core groups each of which includes a plurality of cores and a last level cache (LL cache) that is shared by the plurality of cores. The LL cache includes a data RAM that stores data, and a cache tag that manages the state of data. The cache tag of the LL cache will hereafter be referred to as an LL tag (LLTAG).

The plurality of core groups is connected to a router, and a home agent (HA) of a memory (main memory) belonging to each core group is connected to the router. The memory is normally a memory chip that is different from the chip of the processor. A memory interface (memory access controller), which controls access to the memory chip, is connected to the home agent.

The home agent includes a tag directory (TAGD) which stores owing information or take-out information on the data in the memory being owned or taken out by the LL cache of the core group, and manages which LL cache of the core group, out of the plurality of core groups, has been taken out and owns the data in the memory.

The processor, on the other hand, includes an IO control unit that is connected to the router, and the processor is connected to an IO device, which is a peripheral apparatus, via the IO control unit. The IO device is connected to a peripheral component interface (PCI), for instance, and issues a store request to the processor via the PCI. The store request issued by the IO device is referred to as an IO store request. In the processor, the received IO store request reaches the LL cache in the core groups, via the router, that manages the data at the store destination address.

The above kind of processor is referred in the following patent literatures.
Japanese Patent Application Publication No. H07-121308
Japanese Patent Application Publication No. H11-167557

SUMMARY

The PCI Express requires strong ordering as a standard specification. An IO store request that is requested from an IO device to a processor has either a strong ordering attribute which guarantees the order of store processing, or a relaxed ordering attribute which does not have to guarantee the order of store processing. In the case of the IO store, the store processing for the processor to store data to a memory takes a different processing time depending on an owing state of the cache of data at the store destination address. Further, in a multi-core processor, the time of the store processing differs between a case of a home core group owning the data at the store destination address, and a case of a remote core group owning the data.

Therefore, conventionally when an IO store request with a strong ordering attribute, which has restrictions of an order guarantee, is issued from the IO device, the processor processes the IO store request using a direct memory system. In a case of the direct memory system, once an IO store request is issued, the IO device is unable to issue the next IO store request until a completion notification of this IO store request is received. However, since a series of processing flows until receiving the completion notification of the IO store request is long, therefore the IO device is incapable of continuously issuing IO store requests in a short time. As a result, the IO device is incapable of continuously issuing IO store requests with order guarantee, at a speed corresponding to a throughput performance of the IO bus.

An arithmetic processor includes a plurality of core groups each of which includes a plurality of cores and a cache unit shared by the plurality of cores; a plurality of home agents which belong to the plurality of core groups respectively, and each of which includes a tag directory configured to store ownership information of the plurality of core groups relating to data in memories, which belong to the plurality of core groups respectively; and a store command queue which includes an entry queue configured to enter a store request with order guarantee, received from an input/output device, in order of reception, and the cache unit includes a data RAM that stores data, a cache tag that stores a state of data in the data RAM, and a cache control unit. Responding to reception of the store request with order guarantee, (a) the store command queue enters the received store request to the entry queue in order of reception, (b) the cache control unit checks the cache tag, and in a case where an address of the received store request is not registered in the data RAM, the cache control unit stores the data of the store request in the data RAM, and issues a data ownership acquisition request to the home agent to request to acquire data ownership of an address of the store request, (c) the home agent checks the tag directory in response to the data ownership acquisition request, and in a case where the data ownership is acquired, the home agent responds with a data ownership acquisition notification to the cache control unit of the request source, (d) in response to the data ownership acquisition notification, the cache control unit sends the data ownership acquisition notification to the store command queue, and sets an address lock to disable access to the address of the store request, (e) in response to the data ownership acquisition notification, the store command queue sets a data ownership acquisition flag of the store request, corresponding to the data ownership acquisition notification, to valid, (f) the store command queue issues a top-of-queue notification to the cache control unit, for a store request which is in a top-of-queue entered earliest in the entry queue, and of which data ownership acquisition flag is valid, and deletes the entry of the store request of the top-of-queue, and (g) in response to the top-of-queue notification, the cache control unit updates the cache tag to a modified state, issues a store request completion notification to an input/output device, and releases the address lock.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 indicates the dead lock state in Operation Example 5.

DESCRIPTION OF EMBODIMENTS

Figure 1:
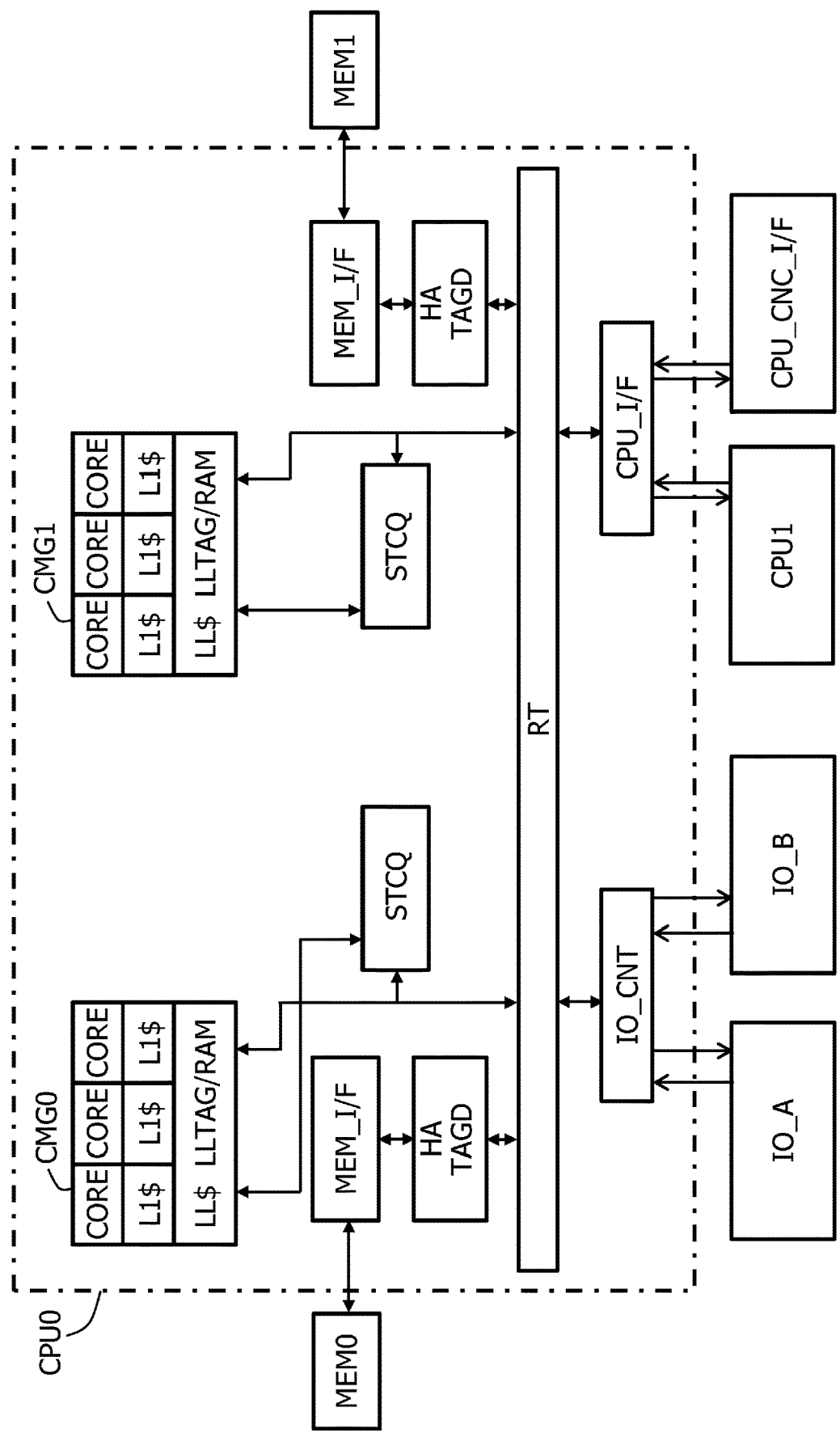
FIG. 1 is a diagram depicting Configuration Example 1 of the processor according to the present embodiment.

In order to assist in understanding of the present embodiment, some matters related to an IO store request in a processor will be described.

(1) In a case of an IO store request with order guarantee, the processor completes store processing of a plurality of IO store requests issued from the IO device in order of issuing from the IO device, or in order of the reception by the processor. However, it is not required that the completion timing of the store processing is in order of the issuing, or in order of the reception for the software that issues the IO store request with order guarantee. In other words, when a plurality of data at addresses of a plurality of IO store requests are read at a certain timing, it is demanded to prevent the state that the data at an address of a first IO store request which is issued first is data before the storing, and the data at an address of a second IO store request which is issued after the first IO store request is data after the storing. Therefore, even if the data at the address of the first IO store request is unable to be read and the data at the address of the second IO store request is data after the storing when a reading is requested, order guarantee is satisfied if the data at the address of the first IO store request is data after storing when reading afterwards. Further, in a case where both of the data at addresses of the first and second IO store requests are data after the storing, or in a case where the data at the address of the first IO store request is data after the storing but the data at the address of the second IO store request is data before the storing, both of these cases satisfy the order guarantee.

(2) Cache coherence refers to a state where data at a same address has consistency among last level caches (hereafter LL caches) of a plurality of cores or core groups. In a case of processing an IO store request, it is checked whether the data in a memory at a store destination address of the store request has been taken out to (or transferred to, copied in) an LL cache of another core or core group, in order to maintain the cache coherence. Whether the data has been taken out or not is checked by checking a tag directory in which data take out information is recorded. In the case where the data has not been taken out, the core or core group at the store request source acquires the ownership of the data first, then the data of the store request is written in the memory or the LL cache. If the data has been taken out, the remote LL cache to which the data was taken out is requested to eject (write back) the data to the memory or to abandon the ownership. After the ownership is abandoned, the data of the store request is written in the local memory or LL cache.

(3) Cache injection is processing that when an IO store request is received, data is written in the cache instead of the memory, and the data in the cache is written in the memory when this data is ejected from the cache. In the case of cache injection, the data of the IO store request is not written in the memory, but in order to maintain the cache coherence, the tag directory need to be checked, so that when needed, ejection of data in the cache of another or core group or abandonment of the ownership is requested. Since the time for processing each IO store request may be different, hence even if the IO store requests with order guarantees are processed by the cache injection, an improvement of the throughput of the IO device issuing the IO store requests with order guarantees is limited.

(4) The IO store requests include: a full store request where the IO store request includes all the data of the cache line; and a partial store request where the IO store request includes only a part of the data of the cache line. In the case of the partial store request, the LL cache that received the IO store request has to read the rest of the data of the cache line from the memory.

(5) The IO store requests also include: a store request with valid memory tag attribute where a memory tag, which is a security code for the data in the memory, is also registered in the cache; and a store request with invalid memory tag attribute where the memory tag need not be registered in the cache. The code of the memory tag is a code for checking the authority of the core which issued a load request in a multi-core processor. In the case of an IO store request with valid memory tag attribute, the memory tag need to be read from the memory and be registered in the LL cache along with the data of the IO store request. Generally, the IO store request does not include a memory tag of the store target data. Further, the information on the memory tag is written in the memory first when the data is updated by the core. Mainly when the memory is updated by software, a pair of the data and the security information thereof (information on the memory tag) is written in the memory. Then in an IO store request thereafter, only the data is updated, and in the cache injection, the information on the memory tag also needs to be registered in the LL cache.

(6) In the processing of a store request, when acquiring a data ownership at a store destination address, the LL cache control unit of the processor sets an address lock for the store destination address to disable processing for this address, and clears the address lock when a processing completion for the store request is notified.

Configuration Example of Processor in The Embodiment

A processor according to the present embodiment includes a store command queue in a core group to enter IO store requests in order of reception. The processor enters IO store requests with order guarantees in the store command queue in order of reception of IO store request, and stars speculatively the processing of the IO store requests using the LL cache as a buffer for the stored data of the IO store requests. The processor stores data ownership acquisition flags of the addresses of the IO store request in the store command queue, and for the IO store request in the store command queue, whose ownership acquisition flag in the store command queue is valid and whose entry is oldest, the processor changes the cache tag in the LL cache to modified state, and issues an IO store request completion notification. Thereby the processor can receive the issued IO store request while guaranteeing the order of reception, and can increase the IO store issuing throughput of the IO device to the IO bus performance level.

FIG. 1 is a diagram depicting Configuration Example 1 of the processor according to the present embodiment. FIG. 1 indicates a configuration example of a 6-core processor (CPU chip) CPU0. Each of the core groups CMG0 and CMG1 includes a plurality of (3 in the example in FIG. 1) cores CORE, a level 1 cache L1$ belonging to each of the plurality of cores CORE, and a last level cache (LL cache) LL$ which is shared by the plurality of cores. The LL cache LL$ includes an LL tag LLTAG in which state information of the cache e.g., MESI is stored, an LL data RAM LLRAM in which data is stored, and an LL cache control unit (not illustrated). Furthermore, each core group CMG0 and CMG1 includes a store command queue STCQ. The store command queue STCQ is able to communicate with a router RT and the LL cache LL$.

The plurality of core groups CMG0 and CMG1 are connected to the router RT, and home agents HA, which belong to the core groups CMG0 and CMG1 respectively, are connected to the router RT. Each home agent HA has a tag directory TAGD, and the tag directory TAGD stores taken out information or owning information (directory tag information of the memory) by the LL cache of each core group, for the data in the memory MEM0 managed by each core group. The home agent HA accesses the memory MEM0 managed by the home agent HA via a memory interface MEM_I/F (memory access controller). The memories MEM0 and MEM1, which are indicated on the left and right in FIG. 1, are in a multi-bank configuration by dividing the memory region so that the 2 core groups are able to access the memory in parallel.

The router RT controls communication between the core groups or communication with outside the CPU chip. In other words, the LL cache LL$ of each core group communicates with the LL cache LL$ of the other core group via the router RT. The router RT also communicates with the IO device IO_A and IO_B outside the CPU chip via an input/output control device IO_CNT. In the same manner, the router RT communicates with another CPU chip CPU1 on the same system board via a CPU interface device CPU_I/F. Furthermore, the router RT communicates with a CPU connection interface CPU_CNC_I/F to communicate another system board.

Figure 2:
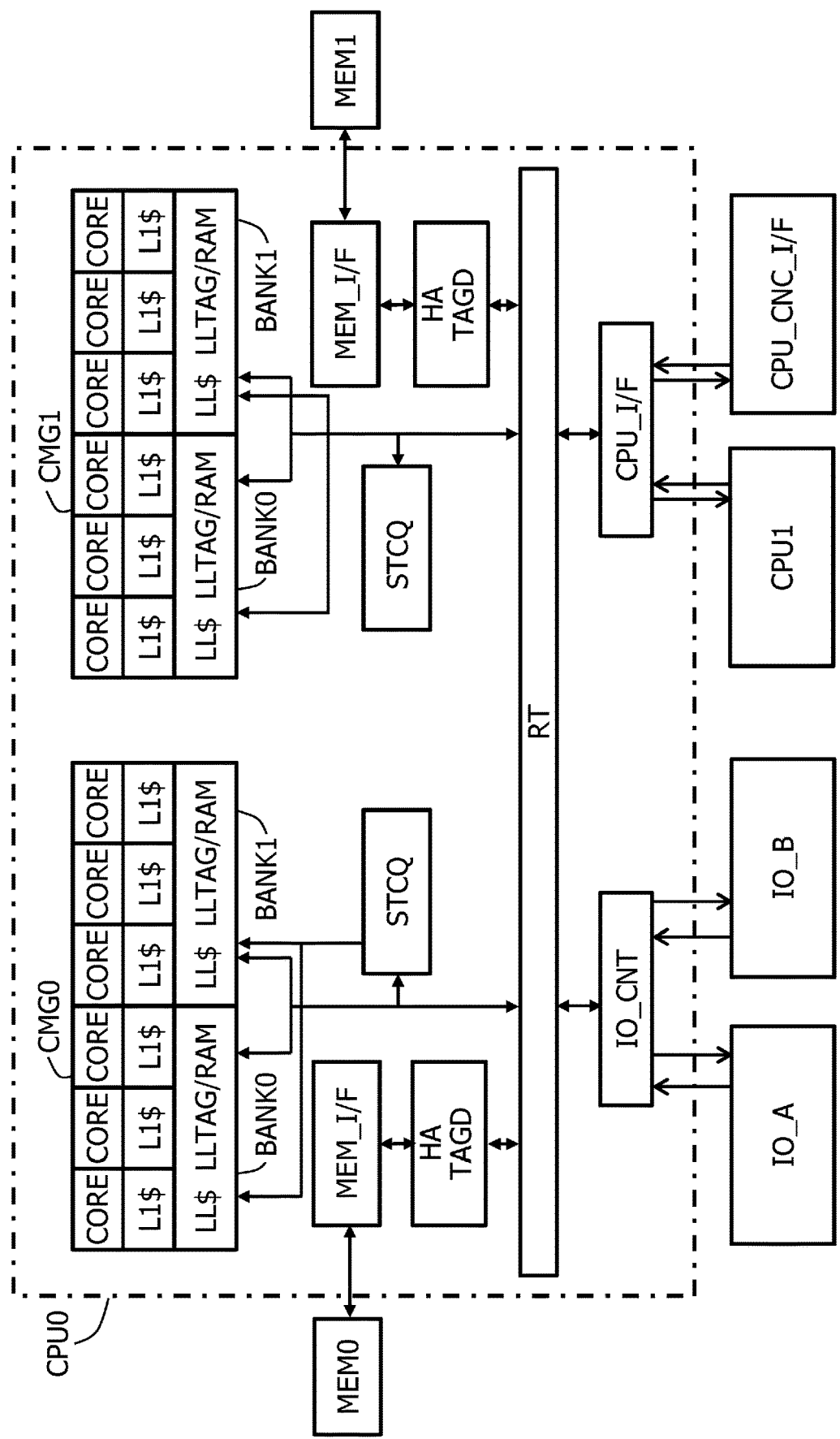
FIG. 2 is a diagram depicting Configuration Example 2 of the processor according to the present embodiment.

FIG. 2 is a diagram depicting Configuration Example 2 of the processor according to the present embodiment. FIG. 2 indicates a configuration example of a 12-core processor CPU0. Unlike FIG. 1, each of the core groups CMG0 and CMG1 includes 6 cores CORE and 2 LL caches LL$. Each of the 2 LL caches LL$ is shared by 3 cores CORE respectively. One LL cache of the 2 LL caches LL$ of each core group belongs to a bank 0, and the other LL cache belongs to a bank 1.

Except for the above-mentioned differences, in the processor in FIG. 2, each core group has a store command queue STCQ, and includes the router RT, the home agent HA, and the memory interface MEM_I/F, just like FIG. 1. The LL caches LL$ in the bank 0 and bank 1 in each core group are able to access memory regions (bank 0 and bank 1) in parallel, each memories MEM0 and MEM1 with a multi-bank configuration is divided into the memory regions (bank 0 and bank 1). Thereby the pipeline configuration to access the memory of the LL$ control unit is expanded, and the processing speed is able to be increased. In this case, in the tag directory TAGD of each home agent HA, the takeout destinations of the data in the memory are recorded by differentiating the bank 0 and bank 1 of LL cache LL& of each core group.

The store command queue STCQ manages the order of processing of a series of IO store requests with order guarantees issued by a specific IO device. The store command queue also manages the order of processing for each of the series of IO store requests with order guarantees issued by a specific IO device. Therefore, the store command queue STCQ may be disposed for each core group, or one store command queue STCQ may be shared by a plurality of core groups.

Figure 3:
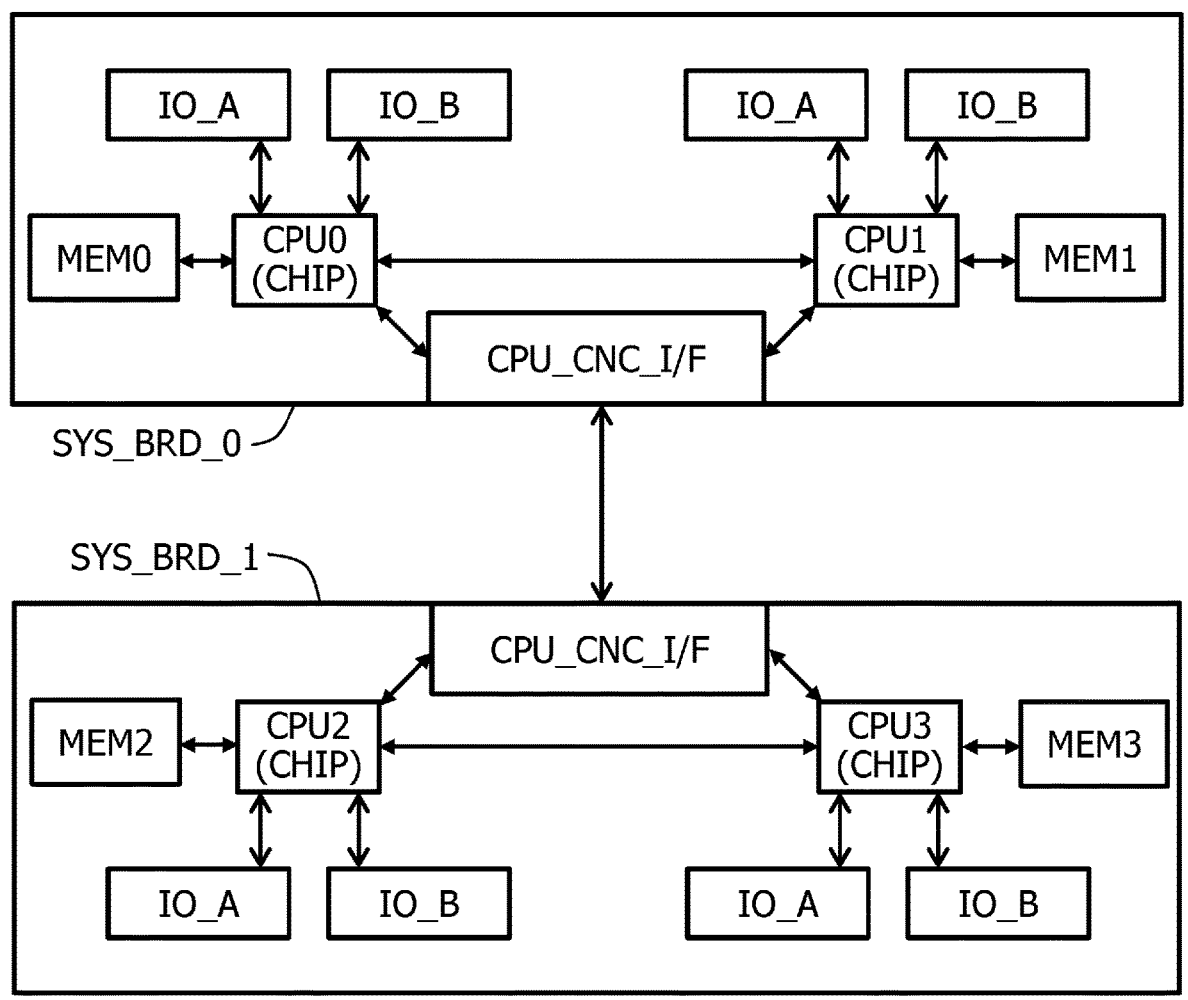
FIG. 3 is a diagram depicting a configuration example of a system board, e.g., a server equipped with the CPU chip.

FIG. 3 is a diagram depicting a configuration example of a system board, e.g., a server equipped with the CPU chip. A system board SYS_BRD_0 includes 2 CPU chips CPU0 and CPU1, memories MEM0 and MEM1 accessed by each CPU chip respectively, a plurality of IO devices IO_A and IO_B connected to each CPU chip, and a CPU communication interface CPU_CNC_I/F that controls communication with another system board. A system board SYS_BRD_1 has the same configuration as the system board SYS_BRD_0.

Figure 4:
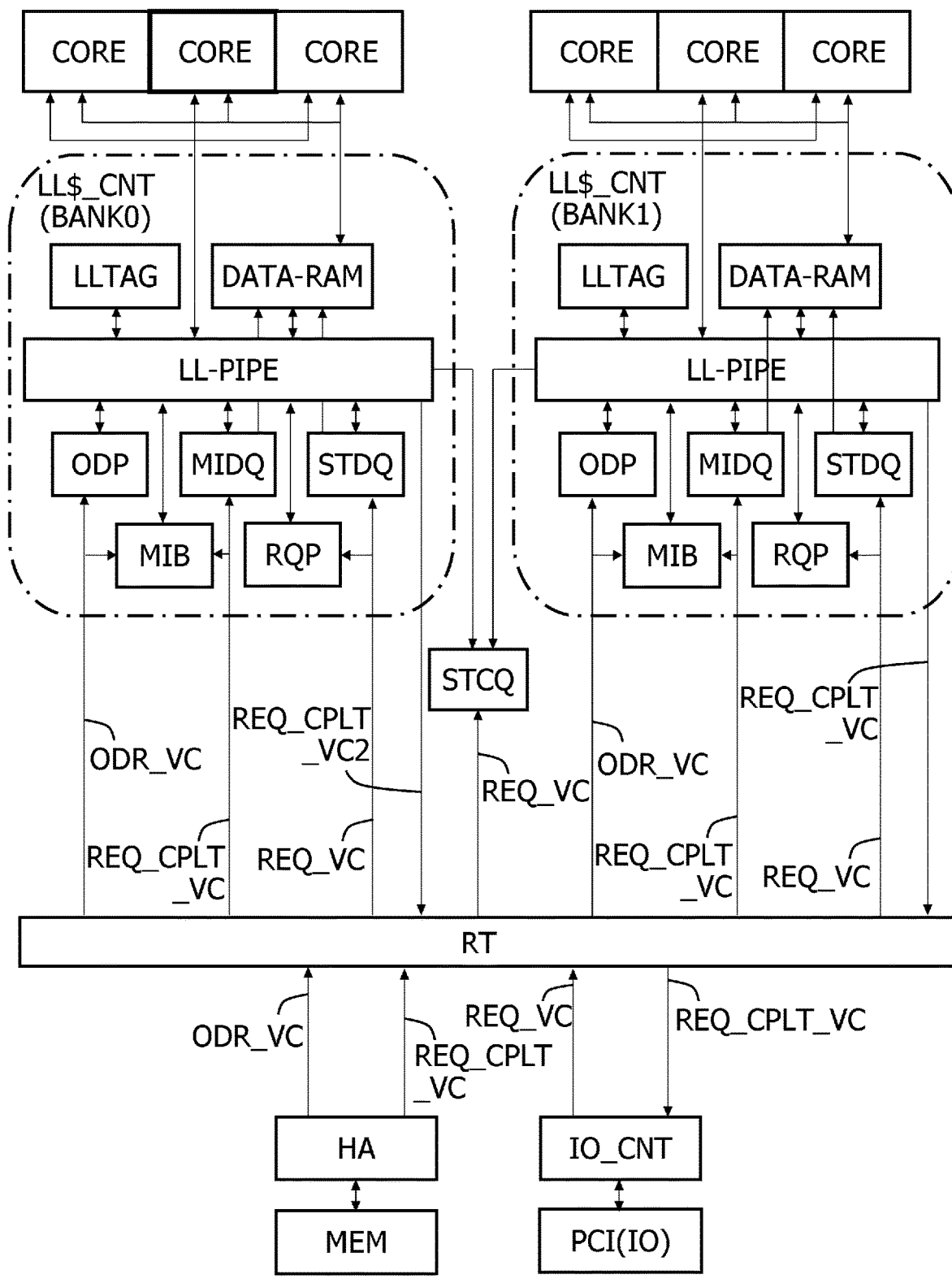
FIG. 4 is a diagram depicting a configuration example of the LL cache control unit and the store command queue within a core group.

FIG. 4 is a diagram depicting a configuration example of the LL cache control unit and the store command queue within a core group. FIG. 4 indicates a configuration example of the LL cache control unit LL$_CNT of the core group CMG0 or CMG1, elements in the LL cache control unit LL$_CNT, and a virtual channel VC between the store command queue STCQ and the router RT.

The LL cache control unit LL$_CNT of each bank BANK0 and BANK1 includes a request port RQP that receives a request such as an IO store request, and an order port ODP that receives an order such as a snoop request. The LL cache control unit also includes a move in control unit MIB that controls registration of (or move in) the data to the cache, and a move in data queue MIDQ that temporarily stores data to be moved in. Furthermore, the LL cache control unit includes a store data queue STDQ that temporarily queues data to be stored by the IO store request.

The LL tag LLTAG and the data RAM DATA-RAM disposed in the LL cache are accessed from a pipeline circuit LL-PIPE of the LL cache control unit. The pipeline circuit LL-PIPE is communicably connected with the request port RQP, the order port ODP, the move in control unit MIB, the move in data queue MIDQ, the store data queue STDQ, the store command queue STCQ, the core CORE, the router RT, and the like.

Each element in the LL cache control unit and the store command queue STCQ is connected via the router RT and the illustrated virtual channel VC. The virtual channel VC is physically one bus, but is regarded as a plurality of buses in logical. Passing among the virtual channels is allowed, but passing within a same virtual channel is disabled. Even if signal propagation is blocked in a certain virtual channel, signals are able to be propagated in the other virtual channels without interruption.

Signals are propagated via REQ-VC for PCI→RT→STCQ, RQP and STDQ, via REQ-CPLT-VC for LL-PIPE→RT→PCI, via ODR-VC for HA→RT→MIB and ODP, and via REQ-CPLT-VC for HA→RT→MIB and MIDQ.

Figure 5:
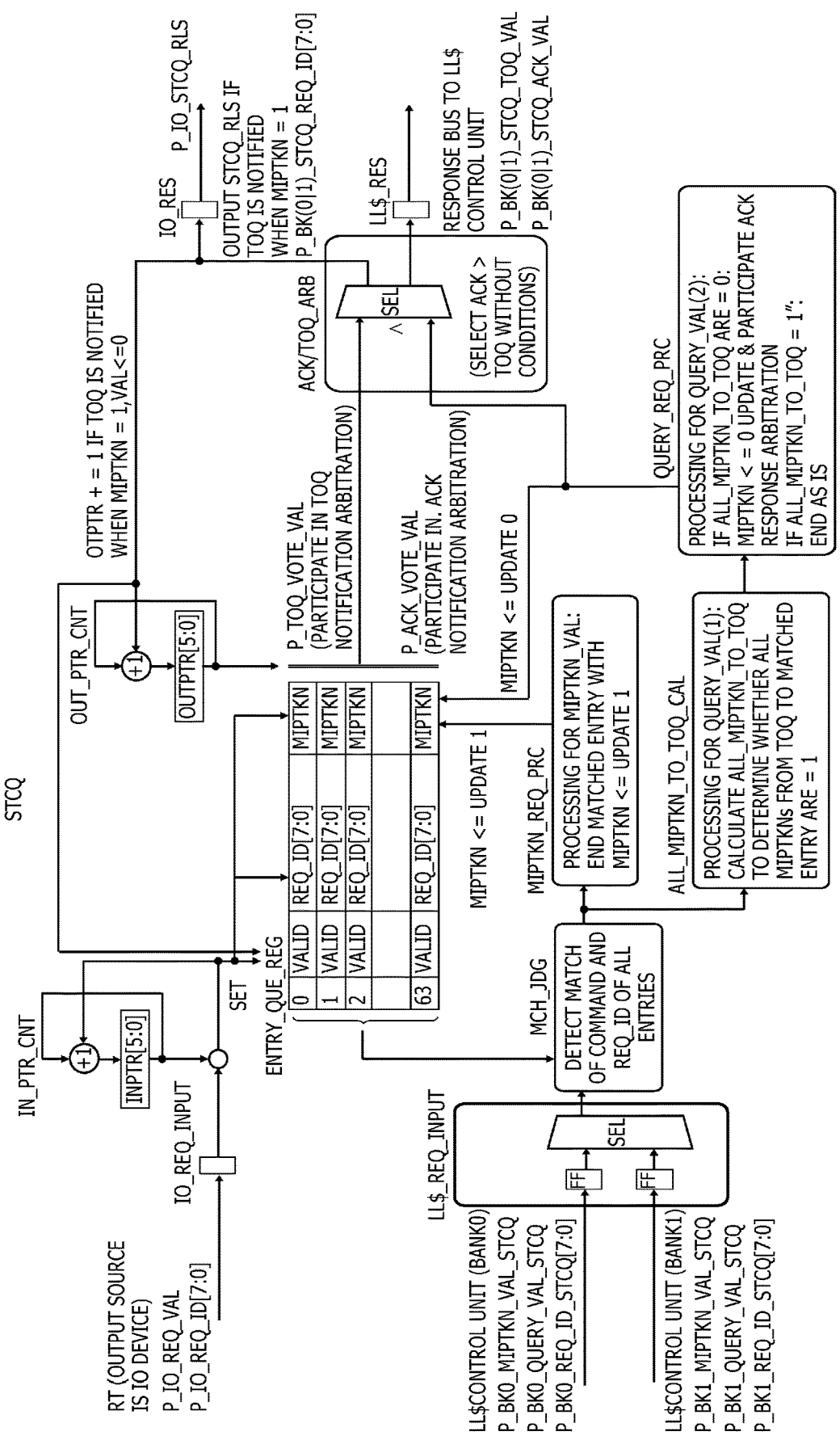
FIG. 5 is a diagram depicting a configuration example of the store command queue.
Figure 6:
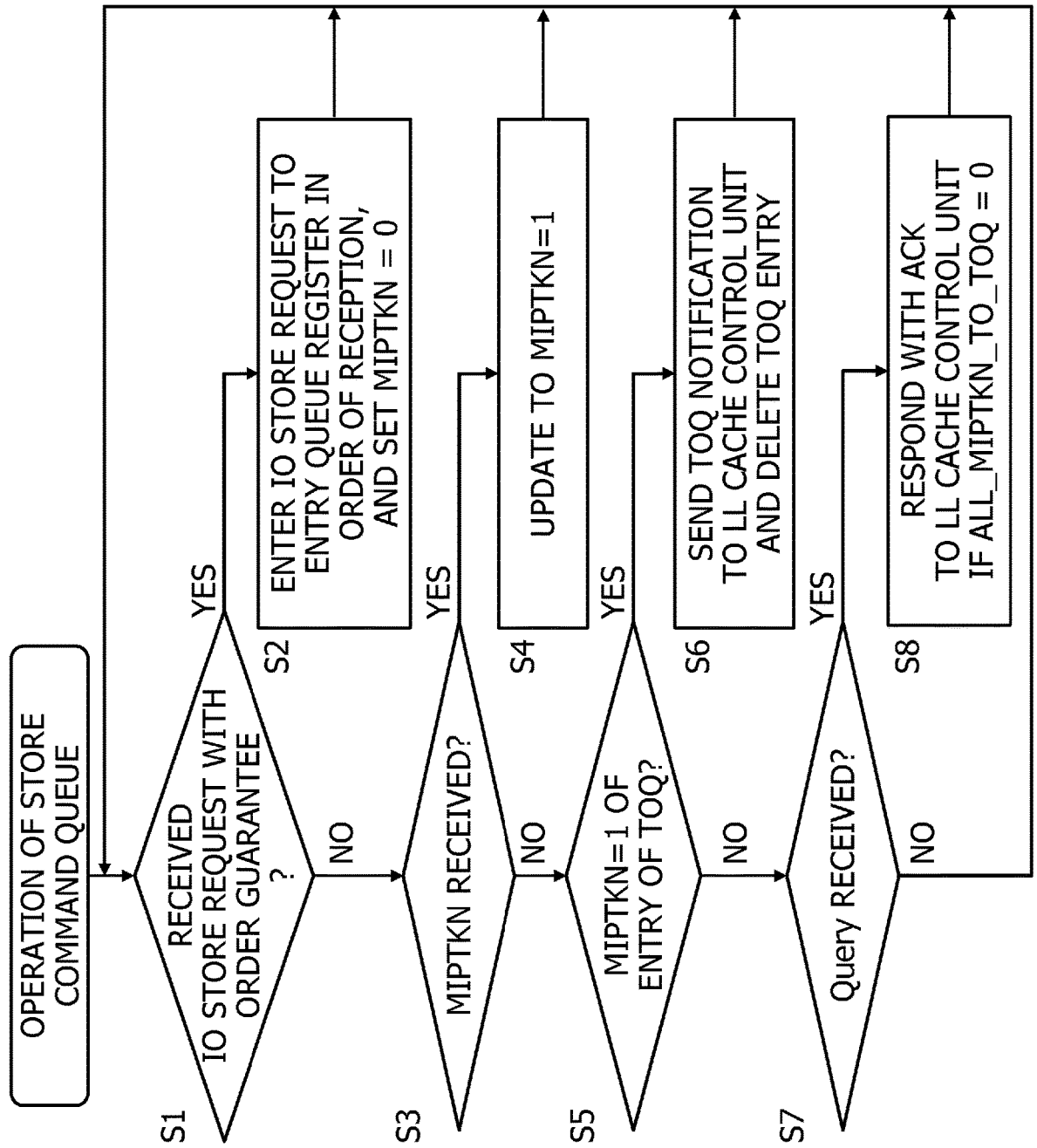
FIG. 6 is a flow chart depicting an operation example of the store command queue.

FIG. 5 is a diagram depicting a configuration example of the store command queue. FIG. 6 is a flow chart depicting an operation example of the store command queue. A general operation of the store command queue STCQ is as indicated in FIG. 6.

As the first operation steps, when an IO store request with order guarantee is received (S1), the store command queue STCQ enters the received IO store request to an entry queue register ENTRY_QUE_REG in order of reception (S2). When a notification, that data ownership of the address of the IO store request is acquired, is received from the LL cache control unit (S3), the store command queue changes a data ownership acquisition flag MIPTKN of the target IO store request to valid "1" (S4). In a case where there is an entry which is a top-of-queue (TOQ), that is the oldest in the entry queue register, and of which data ownership acquisition flag is valid (S5), the store command queue sends a top-of-queue notification (TOQ notification, P_BK(0|1)_STCQ_TOQ_VAL) to the LL cache control unit, and deletes the entry of the top-of-queue (TOQ) from the queue (S6). At the same time, the store command queue sends to the router RT an IO store request entry release notification (P_IO_STCQ_RLS) addressed to the IO device, so as to notify that one more resource of the entry queue register is now available. The above first operation steps S1 to S6 are operation steps to maintain the processing order of the IO store request with order guarantee.

As the second operation steps, when a query request on an IO store request is received from the LL cache control unit (S7), the store command queue STCQ determines whether all the data ownership acquisition flags, from the entry of the query target IO store request to the entry of the top-of-queue, are valid, and in a case where all the flags are not valid (any one of them is invalid) (ALL_MIPTKN_TO_TOQ=0), the store command queue changes the data ownership acquisition flag of the entry of the IO store request from valid to invalid, and replies with an acknowledge ACK (P_BK(0|1)_STCQ_ACK_VAL) to the LL cache control unit (S8). The above second operation steps S7 and S8 are operation steps to minimize a drop in throughput of the IO store request with order guarantee.

As indicated in FIG. 5, when an IO request input unit IO_REQ_INPUT receives an IO store request from the router RT, the store command queue enters the IO store request to the entry queue register ENTRY_QUE_REG in order of reception. As indicated in the IO store request input unit IO_REQ_INPUT, the IO store request sent from the router RT includes a valid signal P_IO_REQ_VAL and a request ID signal P_IO_REQ_ID.

The entry queue register ENTRY_QUE_REG includes 64 entries, for instance, stores IO store requests and guarantees the fetching order of the IO store requests using an in pointer INPTR and an out pointer OTPTR. In other words, when an IO store request with order guarantee arrives, the entry queue register ENTRY_QUE_REG registers a request ID (REQ_ID) of this IO store request in an entry indicated by the in pointer INPTR, sets a valid bit VALID to valid "1", and a data ownership acquisition flag MIPTKN to invalid "0" respectively. Then an input pointer control circuit IN_PTR_CNT increments the in pointer INPTR by +1.

When the LL cache request input unit LL$_REQ_INPUT receives a data ownership acquisition notification MIPTKN (PBNK0_MIPTKN_VAL_STCQ=1), along with the request ID (P_BNK0_REQ_ID_STCQ), from the LL cache control unit, a match determination circuit MCH_JDG detects an entry that matches with the request ID, and updates the data ownership acquisition flag MIPTKN of the entry matched by the MIPTKN request processing unit MIPTKN_REQ_PRC to valid The data ownership acquisition notification arrived to the LL cache request input unit LL$_REQ_INPUT from either the LL cache control unit of BANK0 or the LL cache control unit of BANK1. A selector SEL in the LL cache request input unit selects the notification based on the rotation or by LRU (least recently used).

In a case where the data ownership acquisition flag MIPTKN of the top-of-queue, which is an entry pointed by the out pointer OTPTR, is valid "1", the entry queue register ENTRY_QUE_REG allows the TOQ notification to participate in the arbitration (P_TOQ_VOTE_VAL). When the TOQ notification is granted in the arbitration performed by an ACK/TOQ arbitrating unit ACK/TOQ_ARB, an LL cache responding unit LL$_RES sends the TOQ notification (P_BK(0|1)_STCQ_TOQ_VAL), along with the request ID thereof, to the LL cache control unit of the corresponding bank. At the same time, an IO responding unit IO_RES outputs a store command queue release notification P_IO_STCQ_RLS to the IO device. Further, the valid bit of the corresponding entry is set to "0", and an out pointer control circuit OT_PTR_CNT increments the out pointer OUTPTR by +1.

On the other hand, when the LL cache request input unit LL$_REQ_INPUT receives a query request (P_BKO_QUERY_VAL_STCQ), along with the request ID (P_BKO_REQ_ID_STCQ) thereof, from the LL cache control unit, the match determination circuit MCH_JDG detects an entry that matches with the request ID, and an ALL_MIPTKN_TO_TOQ calculating unit ALL_MIPTKN_TO_TOQ_CAL and the query request unit QUERY_REQ_PRC execute the next processing.

In other words, the ALL_MIPTKN_TO_TOQ calculating unit ALL_MIPTKN_TO_TOQ_CAL calculates ALL_MIPTKN_TO_TOQ which indicates whether all the data ownership acquisition flags MIPTKN, from the match entry detected by the match determination circuit to the entry of the top-of-queue, are "1" or not.

In the case of ALL_MIPTKN_TO_TOQ=1, the query request processing unit QUERY_REQ_PRC recognizes that the match entry is in a waiting state, and eventually becomes TOQ when time elapses. Therefore the query request processing unit waits for the match entry to become TOQ without performing anything.

In the case of ALL_MIPTKN_TO_TOQ=0, on the other hand, the query request processing unit recognizes that the entry of MIPTKN=0 exists between the match entry and TOQ. In this case, it is possible that the match entry does not become TOQ even if time elapses. Therefore, the query processing unit changes the data ownership acquisition flag MIPTKN of the match entry to "0", and sends an ACK response arbitration participation P_ACK_VOTE_VAL=1 to the ACK/TOQ arbitration unit, and allows the ACK response to participate in the arbitration. Since the ACK notification has higher priority than the TOQ notification, the ACK/TOQ arbitration unit unconditionally selects the ACK response. Then the LL$ responding unit LL$_RES responds with the ACK arbitration result along with the request ID (P_BK(0/1)_STCQ_ACK_VAL=1, P_BK(0/1)_STCQ_REQ_ID) to the LL cache control unit of the corresponding bank.

In the multi-core processor, in the case of the store request, the data ownership of the store destination address need to be acquired first before writing the data in the memory or registering the data in the LL cache. This is for maintain a cache coherency between data in the memory and data in the LL cache. The data ownership acquisition notification MIPTKN notifies the acquisition of the data ownership, and requests to set the data ownership acquisition flag MIPTKN of the entry that matches with the request ID, to "1".

The query request, on the other hand, is a request to inquire whether refetch processing is allowed or not, which the LL cache control unit outputs to the store command queue when the TOQ notification is not received from the store command queue STCQ even after a predetermined time is elapsed, or when a hang up state, where the TOQ notification is disabled, is solved. This refetch processing is substantially the same as the data ownership acquisition request.

Figure 7:
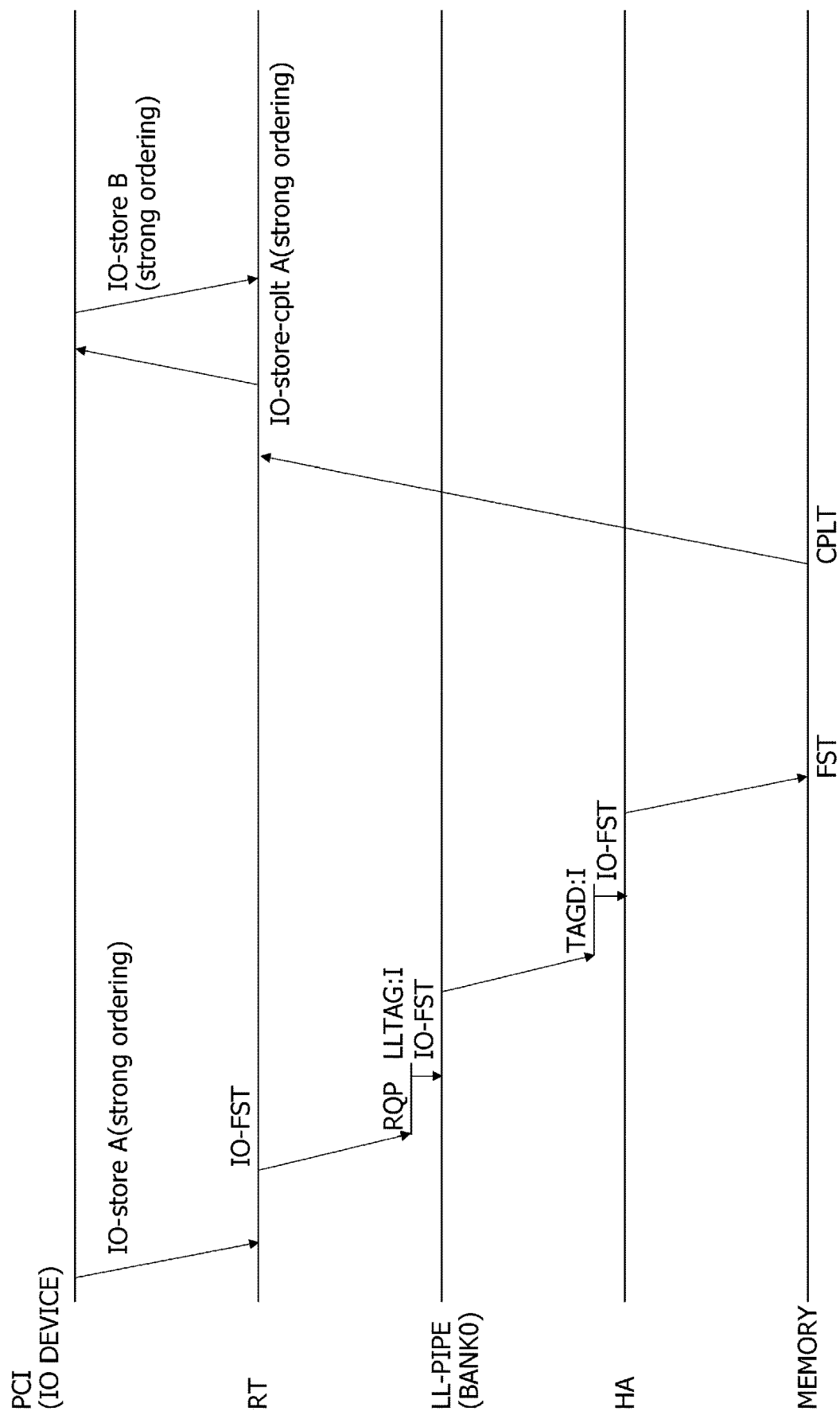
FIG. 7 is a diagram depicting an operation of an IO store request with order guarantee in a case where the store command queue does not exist.

Operation of IO Store Request with Order Guarantee When Store Command Queue Does Not Exist FIG. 7 is a diagram depicting an operation of an IO store request with order guarantee, i.e., strong ordering, in a case where the store command queue does not exist. An IO store A request with order guarantee IO_STORE_A is sent from the IO device to the LL cache control unit LL-PIPE of BANK0 via the router RT. In FIG. 6, the router RT issues a full store request IO-FST as the IO store A request to the LL cache control unit.

When the full store request IO-FST is entered via the request port RQP of the LL cache to the pipeline of the LL cache, it is detected that the LL$ tag LLTAG of the index of the IO store request is invalid I (not owned) and that the tag directory TAGD is also invalid I (not owned) by the full store request IO-FST that the LL cache control unit issued to the home agent HA. To be precise, it is detected that TAGD is local CMG:I and remote CMG:I. In other words, it is detected that the home core group CMG has priority to write the data at the address of the IO store request. Therefore, the home agent HA issues the IO full store request IO-FST to the memory, and writes the data of the IO store request to the memory.

When the completion notification of the IO store is responded to from the memory, the router RT notifies the IO store completion notification IO_store_cplt A to the IO device. Responding to this completion notification, the IO device is able to issue the next IO store B request with order guarantee IO_store_B. In this way, in a case where the store command queue does not exist, the IO device needs to issue the next IO store request with order guarantee after receiving the completion notification of the IO store request with order guarantee issued by the IO device. This means that the throughput of issuing the IO store requests with order guarantee by the IO device is low.

Operation Example of IO Store Request with Order Guarantee of This Embodiment

An operation example of the IO store request with order guarantee according to the present embodiment will be described. An IO store request includes (1) a memory tag (mtag) attribute to store a memory tag, (2) a full store attribute of all the data of the cache line being provided from the IO device along with the IO store request, and (3) a partial store attribute of a part of the data of the cache line being provided from the IO device, while the rest of the data needs to be read from the memory and be written to the cache. As mentioned above, the memory tag is a security code of the data of the memory, is stored in the memory along with the data, and is also stored in the cache. In the multi-core processor, the memory tag is a code to check the authority of the core which issued the load request.

Further, in an IO store request, the operation of the IO store request is different depending on whether the "data before storing" in the memory at the address of the IO store request is not registered (LLTAG=I) in the LL cache, or is already registered (LLTAG=E), and whether the tag directory TAGD of the home agent HA indicates that the local core group CMG does not have the ownership of the "data before storing" in the memory at the address of the IO store request in the memory (TAGD (local CMG): I), or indicates that the local core group CMG has the ownership of the same (TAGD (local CMG): E). The operation of the IO store request is also different in the case where the tag directory TAGD indicates that the remote CMG has the ownership (TAGD (remote CMG): E or S).

Operation examples of the IO store request based on a combination of various states described above will be described.

Before describing the operation examples, several types of MVIN flows, which the move in control unit MIB in the LL cache control unit issues to LL-PIPE, will be described, since these MVIN flows will appear in the following operation examples of the IO store request.

MVIN (write-STDQ) is a flow to write the store data from the store data queue STDQ to DATA-RAM. MVIN (write-MIDQ) is a flow to write the response data, which is received from the memory or the remote CMG, from the move—in data queue MIDQ to DATA-RAM. MVIN (TAG_upd) is a flow to complete the flow and perform an update of LL-TAG, and issuing REQ-CPLT. MVIN (MIPTKN) is a flow to notify MIPTKN to the store command queue STCQ. And MVIN (REFCH) is a flow to issue refetching to HA. When conditions are satisfied, MVIN (write-STDQ/MIDQ), MVIN (MIPTKN) and MVIN (TAG-upd) are simultaneously executed. However, MVIN (write-STDQ) and MVIN (write-MIDQ) are not able to be simultaneously executed.

Operation Example 1 of IO Store Request with
Order Guarantee (Mtag Invalid, IO-FST, LLTAG=I,
TAGD=I)

Figure 8:
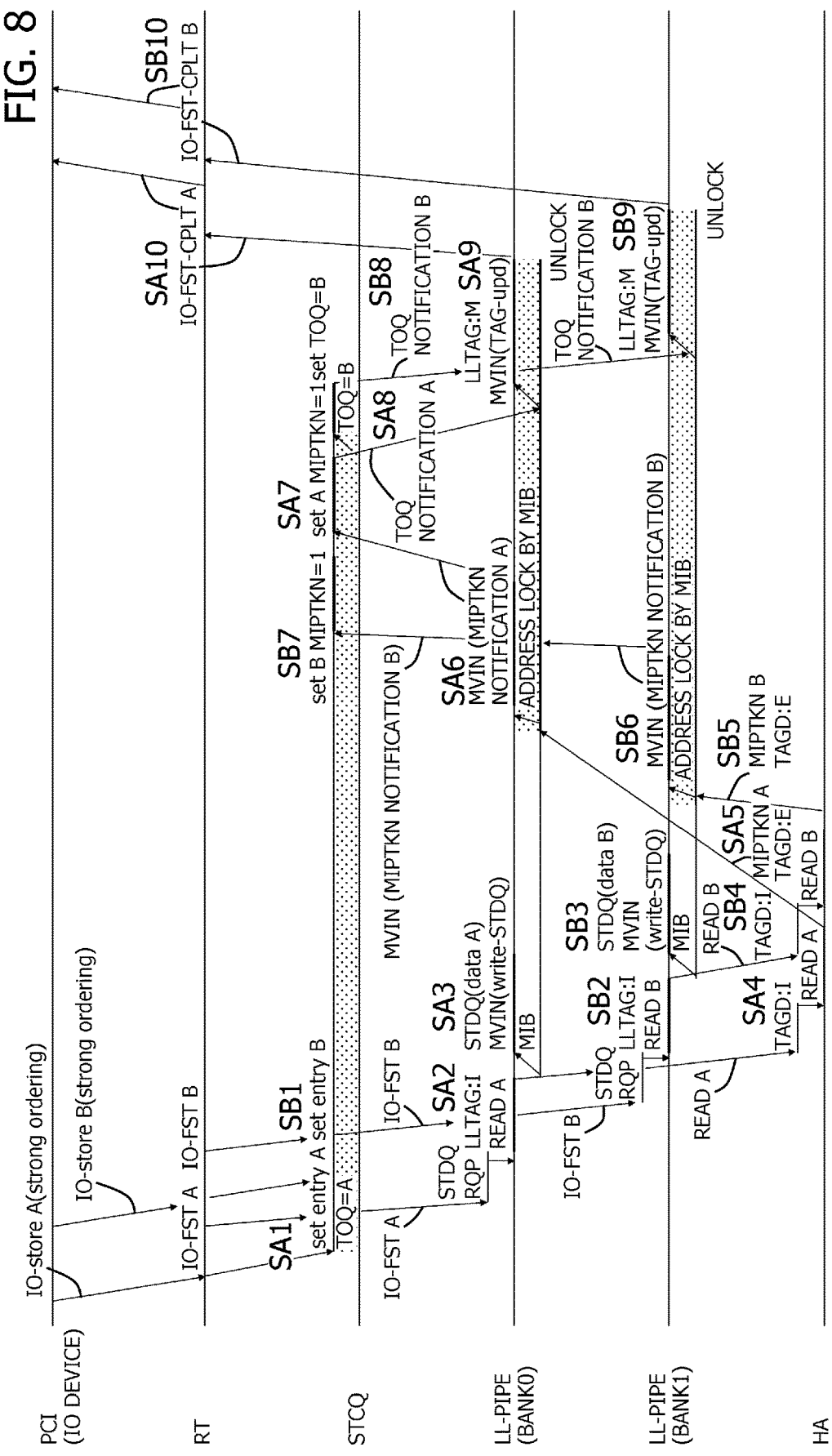
FIG. 8 is a diagram indicating a sequence chart of Operation Example 1 of the IO store request with order guarantee.

FIG. 8 is a diagram indicating a sequence chart of Operation Example 1 of the IO store request with order guarantee. In Operation Example 1, immediately after issuing an IO store request with order guarantee IO_store_A, the IO device issues the next IO store request IO_store_B. The IO store request IO_store_A is hereafter referred to as the IO store request A. The IO store request IO_store_B is hereafter referred to as the IO store request B. The IO store request A is a request to store data A at the address A. The IO store request B is a request to store data B at the address B. In FIG.

8, the state of the tag directory TAGD indicates a state of ownership state in the local core group CMG.

The IO store request A and the IO store request B issued by the IO device are inputted to the store command queue STCQ via the router RT. The IO store request A inputted to the store command queue is entered (registered) in the entry A of the entry queue register ENTRY_QUE_REG, and the IO store request B is entered (registered) in the entry B thereof respectively (SA1, SB1). The data ownership acquisition flags MIPTKN of the entries A and B are both set to 0. At this point, the entry A becomes the top-of-queue TOQ.

For the IO store request A with order guarantee, the router RT issues a full store A (ID-FST A) to the LL cache control unit LL=PIPE of BANK0, and the IO store request A is entered in the request port RQP of the LL cache control unit of BANK0, and the data A of the IO store request A is entered in the store data queue STDQ.

Then the read request READ_A is entered (inputted) to the pipeline LL-PIPE of the LL cache control unit. The state of the LL tag LLTAG (ownership information) is checked by the read request, and it is detected by LL-PIPE that the state of the LL tag LLTAG (ownership information) in LL-PIPE is either invalid or has no ownership (LLTAG=I) (SA2). Therefore, to make the home agent HA check the ownership information of the data in the memory at the address of the IO store request, the pipeline of the LL cache control unit issues a read request READ_A to the home agent HA, and it is determined that the tag directory TAGD is either invalid or has no ownership (TAGD=I) (SA4). On the other hand, in the flow of MVIN (write-STDQ) which the move in control unit MIB of the LL cache control unit issues to the pipeline LL-PIPE, the data A in the store data queue STDQ is registered in the data RAM RAM of the LL cache (SA3). Thereby the store data A is buffered in the LL cache. However, the store data A in the LL cache cannot be read by a software because the state of the LL tag LLTAG is invalid. Since the store data A is registered in the LL cache but cannot be read, the store data A is just buffered in the LL cache.

Since both the LL tag LLTAG and the tag directory TAGD have no ownership (I: invalid), the home agent acquires the data ownership of the address A of the IO store request A. Then the home agent HA changes the tag directory TAGD to the ownership state (E: Exclusive) in the flow of READ_A, and replies with the data ownership acquisition notification MIPTKN_A to the LL cache control unit of BANK0 (SA5). The data ownership acquisition notification MIPTKN_A notifies that the processing of IO_FST or IO_PST, corresponding to the IO store request, is able to be started, and the processing will eventually complete.

In Operation Example 1, since the state in mtag is invalid and full store, the home agent HA need not issue an mtag read request or a store data read request to the memory as depicted in FIG. 8.

When the LL-PIPE of the LL cache control unit of BANK0 receives the data ownership acquisition notification MIPTKN_A, the move in control unit MIB performs address lock, which locks the processing for the address A of the IO store request A, and LL-PIPE issues the MIPTKN notification A to the store command queue STCQ using a command MVIN (MIPTKN notification A) entered by the move in control unit (SA6). During address lock, processing for the address of the IO store request A is disabled, and reading data before storing, existing at the address A of the IO store request A, for instance, is disabled. Address lock is a processing that is also performed when the data ownership is acquired in a regular store request, and indicates that the data in this address is currently being updated, and access to the data at the address is disabled until the data update completes. The address lock is not a processing unique to the IO store request with order guarantee.

For the IO store request B as well, processing steps SB1 to SB6 are executed just like processing steps SA1 to SA6 for the IO store request A.

Here, in order to describe the operation of order guarantee (strong ordering) by the store command queue STCQ, it is assumed that the MIPTKN notification B reached the store command queue before the MIPTKN notification A for reasons not stated here.

Responding to the input of the MIPTKN notification B, the store command queue STCQ sets the data ownership acquisition flag MIPTKN of the entry B of the entry queue register ENTRY_QUE_REG to valid "1" (SB7). However, the top-of-queue TOQ is still the entry A, hence the entry B is not released first from the entry queue. Therefore, the entry B remains in the entry queue register until the entry A, of which IO store request was received first, is released. During this period, the data B is not read from the LL cache due to the address lock of the address B, even if a read request for address B reaches the LL cache.

Next the MIPTKN notification A reaches the store command queue STCQ, and the STCQ sets the data ownership acquisition flag MIPTKN of the entry A to valid "1" (SA7). Since the current top-of-queue TOQ is the entry A, the conditions of TOQ=A and MIPTKN=1 are established here, and the store command queue updates the valid bit of the entry A to invalid (VALID=0) to release the entry A, then increments the out pointer OTPTR by +1, and issues the TOQ notification A to LL-PIPE of the LL cache control unit of BANK0 at the same time (SA8). Thereby the entry B becomes the top-of-queue (TOQ=B).

In the LL cache control unit, responding to the TOQ notification A, the move in control unit MIB enters MVIN (TAG-upd) to the pipeline LL-PIPE, and updates the LL tag LLTAG to M (Modify) (SA9). Simultaneous with (or along with) the update of LLTAG to M, the LL-PIPE issues a completion notification IO-FST-CPLT of the IO store request to the IO device (SA10). Then address lock is released by the move in control unit MIB.

Since the entry B now became the top-of-queue (TOQ=B), and MIPTKN is already MIPTKN=1, the store command queue STCQ release the entry B from the entry queue register in the same manner, and issues the TOQ notification B to LL-PIPE of the LL cache control unit of BANK1 (SB8). Responding to this, the LL cache control unit updates the LL tag LLTAG of the entry B to M (Modify), and issues the complete notification IO-FST-CPLT_B of the IO store request to the IO device (SB10). Then the move in control unit MIB release the address lock.

As mentioned above, in order to guarantee the order of the IO store requests A and B with order guarantees, the store command queue STCQ completes registration of the IO store request A to the LL cache (state where data registration in the data RAM RAM and update of the LL tag LLTAG to M are completed, and "data after storing" is able to be read) before the IO store request B. Here, the release of the address lock by the move in control unit MIB is not synchronized with the TOQ notification, which means that there is no guarantee that the IO store request A is always processed first. However, when the software is able to read the "data after storing" from address B, even if the order of the address lock is in random order, the "data after storing" is always able to be read from address A. As a result, the order of the IO store requests A and B is maintained.

The states where reading the data is enabled and disabled with respect to the data ownership acquisition notification MIPTKN, will also be described.

(1) Before the LL cache control unit receives the data ownership acquisition notification MIPTKN, the "data before storing" at the address is able to be read from the memory.

(2) During the time period from the LL cache control unit receiving the data ownership acquisition notification MIPTKN and locking the address to the release address lock by the move in control unit, this address is inaccessible due to the address lock state.

(3) After the address lock is released, the "data after storing" at the address is able to be read from the LL cache.

In Operation Example 1, in the case where the tag directory TAGD is local CMG: I and remote CMG: E in the processing step SA4 or SB4, this state indicates that the data in the memory in this address is taken out to the LL cache of the remote core group CMG. In this case, the home agent HA acquires the LL cache information of the core group that has taken out the data from the tag directory TAGD, and requests the LL cache of the remote core group CMG to eject (write back to the memory) the data to abandon the ownership of the data. After receiving the response to the eject request, the home agent HA changes the tag directory TAGD to "local CMG: E and remote CMG: I", and sends the data ownership acquisition notification MIPTKN to LL-PIPE of the LL cache control unit of the local core group CMG. Therefore the timing of acquiring the data ownership of the entry A or entry B may delayed, and in some cases the timing of issuing the data ownership acquisition notification of the entry B may occur before the entry A.

Even in such a case, the store command queue STCQ controls the entry to become TOQ in the order of receiving the IO store request, hence the order of the TOQ notification to the LL cache control unit is maintained to be the order of the entry to STCQ.

Operation Example 2 of IO Store Request with Order Guarantee (Mtag Valid or Invalid, IO-FST or IO-PST, LLTAG=E)

Figure 9:
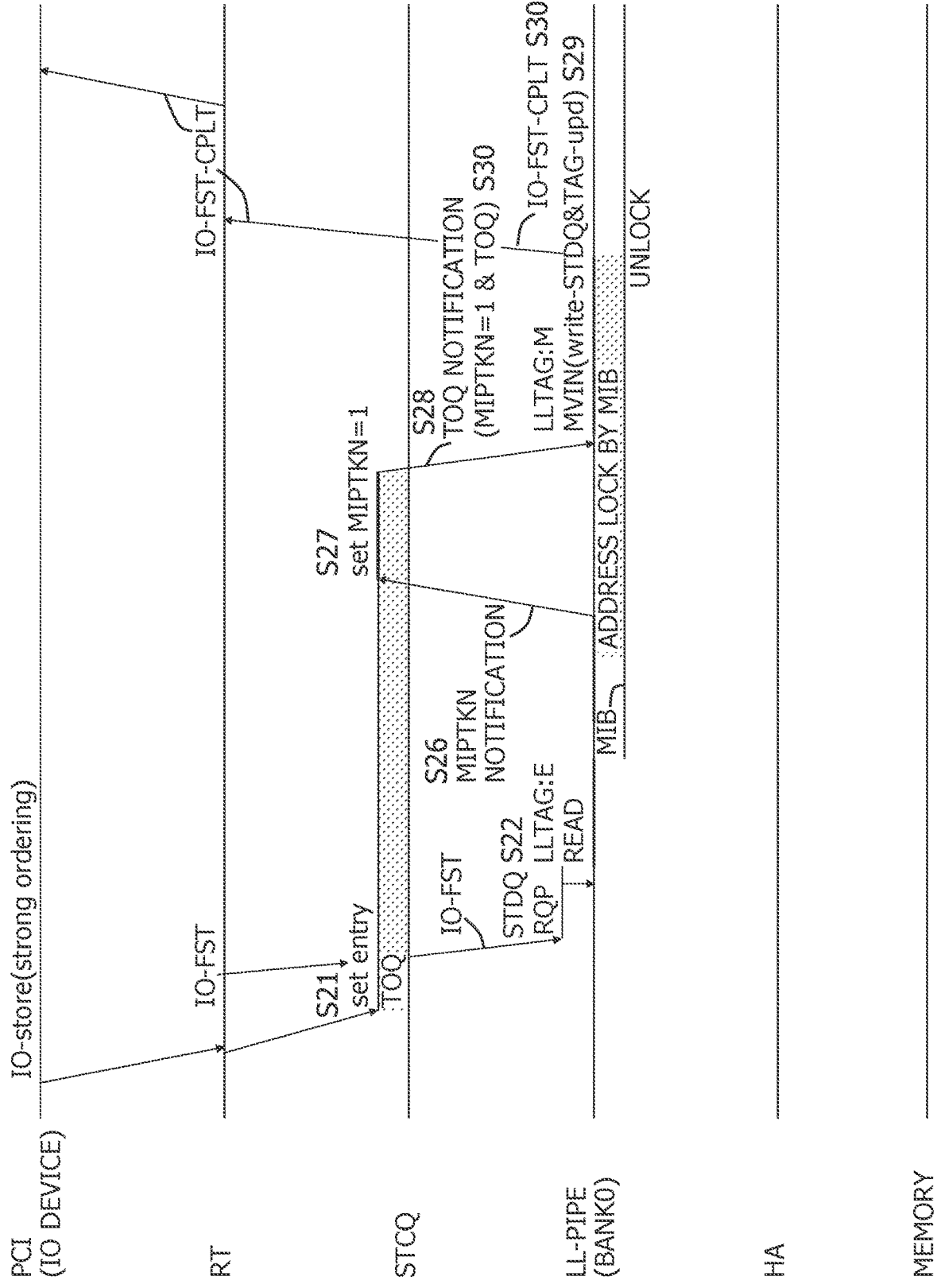
FIG. 9 is a diagram indicating a sequence chart of Operation Example 2 of the IO store request with order guarantee.

FIG. 9 is a diagram indicating a sequence chart of Operation Example 2 of the IO store request with order guarantee. In Operation Example 2, the state of the LL tag LLTAG is E (having ownership), hence a read request (fetch request) is not issued from the home agent HA to the memory, even if mtag is valid (mtag needs to be read from memory) or IO-PST (store data need to be read from memory) is set.

In Operation Example 2, the IO device issues an IO store request IO-store with order guarantee (strong ordering), which reaches the store command queue STCQ via the router RT, and entry of the IO store request is set in the store command queue (S21). On the other hand, an IO-FST issued by the router RT is received by the LL cache control unit of BANK0, and the IO request is stored in the request port RQP thereof, then the stored data is stored in the store data queue STDQ, and the READ flow is inputted (entered) to LL-PIPE (S22). Thus far the processing steps are the same as FIG. 7.

In Operation Example 2, the LL tag LLTAG is E (Exclusive) (S22). Therefore, the data at the address of the IO store request is already in the ownership acquired state, and the LL cache control unit of the local core group confirms the data ownership acquisition. Then LL-PIPE issues the data ownership acquisition notification MIPTKN to the store command queue STCQ (S26), and the move in control unit MIB locks this address.

When the MIPTKN notification is received, the store command queue STCQ sets the data ownership acquisition flag of the entry to valid "1" (S27), and issues the TOQ notification to LL-PIPE of the LL cache control unit of BANK0 if this entry is the top-of-queue (S28). The LL-PIPE executes MVIN (write-STD) and MVIN (TAG-upd) simultaneously, and performs cache registration of the data in the store data queue STDQ and updates the LL tag LLTAG to M (Modify) simultaneously (S29). After completion thereof, the store command queue STCQ issues the IO store request completion notification IO-FST-CPLT, addressed to the IO device, to the router RT (S30).

In Operation Example 2, the data ownership acquisition is confirmed by the LL tag LLTAG (LLTAG: E) of the LL cache control unit, hence there is no flow for the home agent HA to check the tag directory TAGD. Just like FIG. 7, even if the IO device continuously issues the IO store request A and the IO store request B both with order guarantee in a short time, the IO store requests are able to be processed in order of issuing, since the store command queue STCQ sends TOQ notification in order of issuing the IO store requests (not indicated in FIG. 8).

Operation Example 3 of IO Store Request with Order Guarantee (Mtag Valid, IO-FST, LLTAG=I, TAGD=I)

Figure 10:
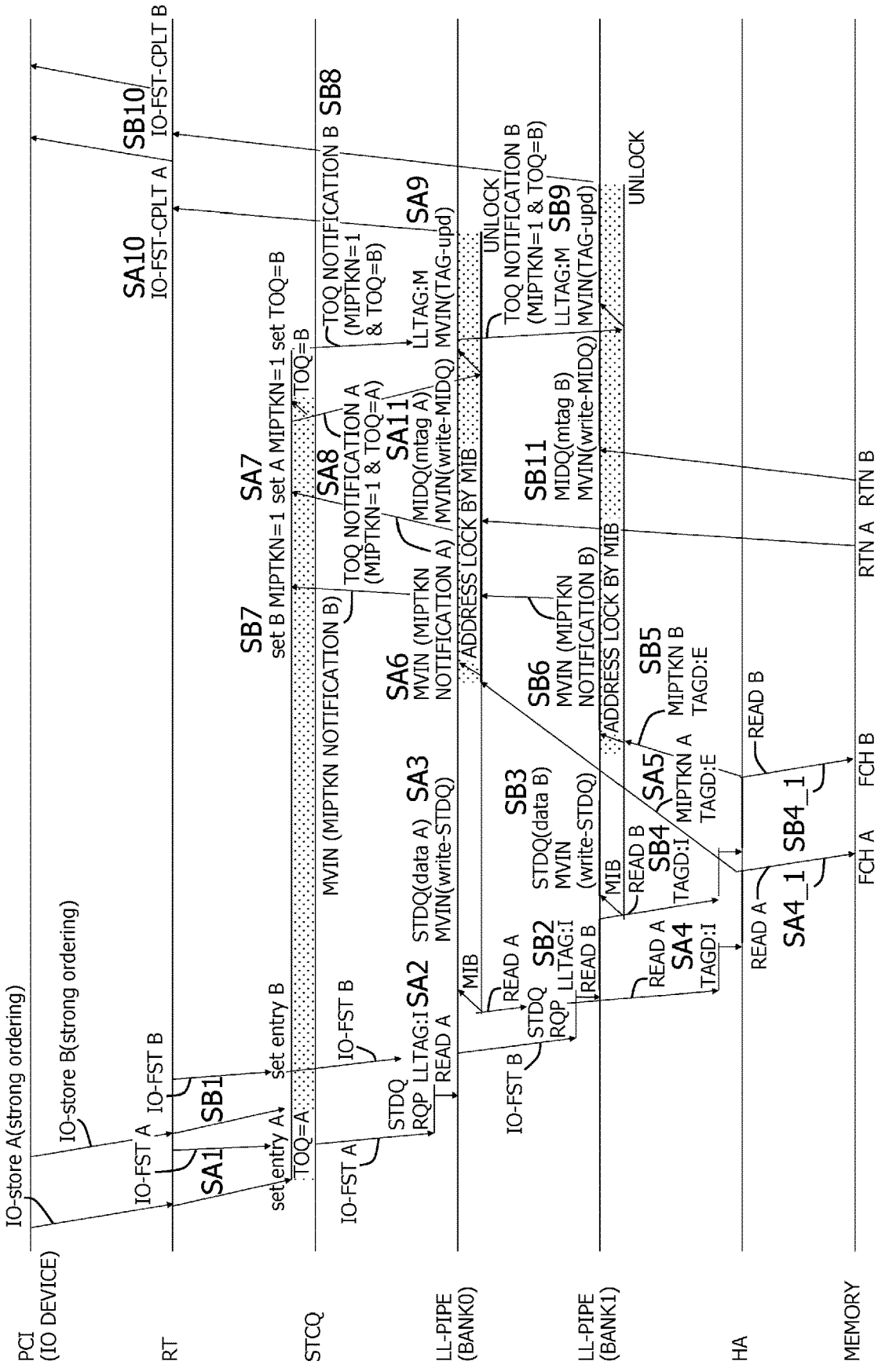
FIG. 10 is a diagram indicating a sequence chart of Operation Example 3 of the IO store request with guarantee.

FIG. 10 is a diagram indicating a sequence chart of Operation Example 3 of the IO store request with guarantee. Operation Example 3 is an example where the memory tag attribute of the IO store request is valid. The rest is the same as Operation Example 1 in FIG. 8. In FIG. 10, a processing step the same as FIG. 8 is denoted with a same reference number (e.g. SA1). Operations of Operation Example 3 different from Operation Example 1 will be for the most part described below.

In Operation Example 3 in FIG. 10, when the home agent HA detects that the tag directory TAGD is TAGD: I (local CMG does not have ownership) (SA4, SB4), the home agent HA issues the fetch request FCH_A or FCH_B to the memory to read the memory tag (SA4_1, SB4_1). Then the memory responds with the memory tag, which was read responding to the fetch request, to LL-PIPE of the LL cache control unit of each bank (RTN_A, RTN_B). When this response is received, the memory tags mtag_A or mtag_B is stored in the move in data queue MIDQ of the LL cache control unit of BANK0 or BANK1 respectively, LL-PIPE executes the MVIN (write-MIDQ) entered by the move in control unit MIB, and writes the memory tag in the move in data queue MIDQ in the data RAM RAM of the LL cache (SA11, SB11).

Then in the LL cache control unit of each BANK0 and BANK1, when both the TOQ notification and the response RTN_A or RTN_B of the fetch request are received, the respective LL-PIPE executes MVIN (TAG_upd) entered by the move in control unit MIB, to update the LL tag LLTAG to M (Modify) (SA9, SB9). In FIG. 10, the response RTN_A or RTN_B of the fetch request reaches the LL cache control unit before the TOQ notification. However, in the case where the response RTN_A or RTN_B of the fetch request reaches the LL cache control unit after the TOQ notification, the move in control unit MIB enters the MVIN (TAG_upd) to LL-PIPE after the response RTN_A or RTN_B reaches the LL cache control unit. In this case as well, the IO store completion notification IO-FST=CPLT is issued at the timing when the LLTAG is updated to M.

Operation Example 4 of IO Store Request with Order Guarantee (Mtag Valid, IO-PST, LLTAG=I, TAGD=I)

Figure 11:
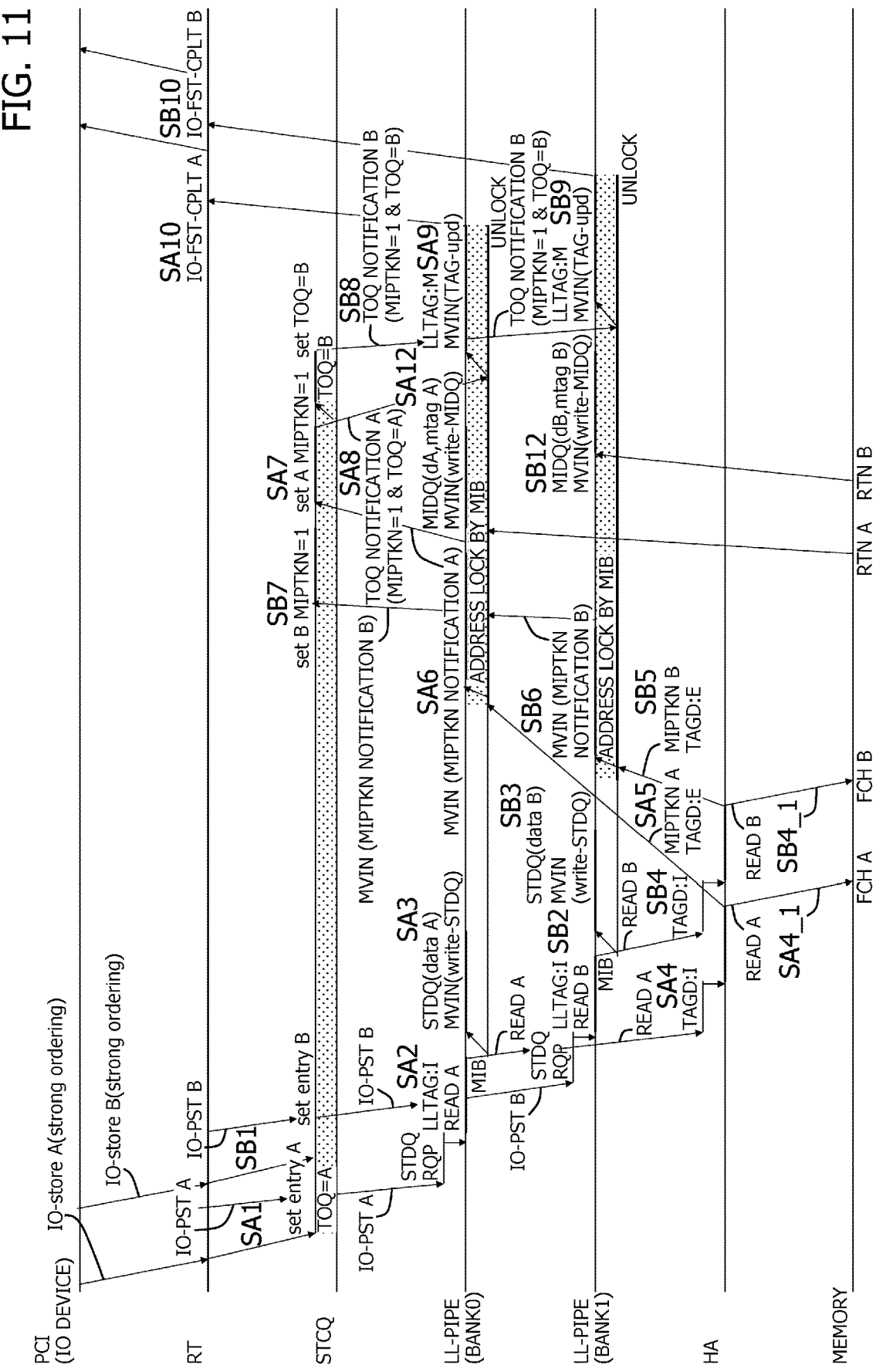
FIG. 11 is a diagram indicating a sequence chart of Operation Example 4 of the IO store request with order guarantee.

FIG. 11 is a diagram indicating a sequence chart of Operation Example 4 of the IO store request with order guarantee. Operation Example 4 is an example where the memory tag attribute of the IO store request is valid, and the partial store IO-PST is set. The rest is the same as Operation Example 1. In FIG. 11, a processing step the same as FIG. 8 is denoted with a same reference number (e.g. SA1). Operations of Operation Example 4 different from Operation Example 1 will be for the most part described below.

In Operation Example 4 in FIG. 11, when the home agent HA detects that the tag directory TAGD is TAGD: I (local CMG does not have ownership) (SA4, SB4), the home agent HA issues the fetch request FCH_A or FCH_B to the memory to read the memory tag and a part of the store data (SA4_1, SB4_1). Then the memory responds with the memory tag and the part of the store data, which were read responding to the fetch request, to LL-PIPE of the respective LL cache control unit (RTN_A, RTN_B). According to this response, the memory tag mtag_A or mtag_B and the store data data_A' or data_B' are stored in the move in data queue MIDQ of the LL cache control unit of BANK0 or BANK1 respectively. Then the LL-PIPE executes MVIN (write-MIDQ) entered by the move in control unit MIB, and writes the memory tag and the store data in the move in data queue MIDQ to the data RAM RAM of the LL cache (SA12, SB12).

Then in the LL cache control unit of each BANK0 and BANK1, when both the TOQ notification and the response RTN_A or RTN_B of the fetch request are received, the respective LL-PIPE executes MVIN (TAG_upd) entered by the move in control unit MIB, to update the LL tag LLTAG to M (Modify) (SA9, SB9). In FIG. 11 as well, the response RTN_A or RTN_B of the fetch request reaches the LL cache control unit before the TOQ notification. However, just like FIG. 10, in the case where the response RTN_A or RTN_B of the fetch request of the memory tag reaches the LL cache control unit after the TOQ notification, the move in control unit MIB enters the MVIN (TAG_upd) to LL-PIPE after the response RTN_A or RTN_B reaches the LL cache control unit. In this case as well, the IO store completion notification IO-FST=CPLT is issued at the timing when the LL TAG is updated to M.

Operation Example 5 of IO Store Request with Order Guarantee (Mtag Valid, IO-FST, LLTAG=I, TAGD=I)

Figure 12A:
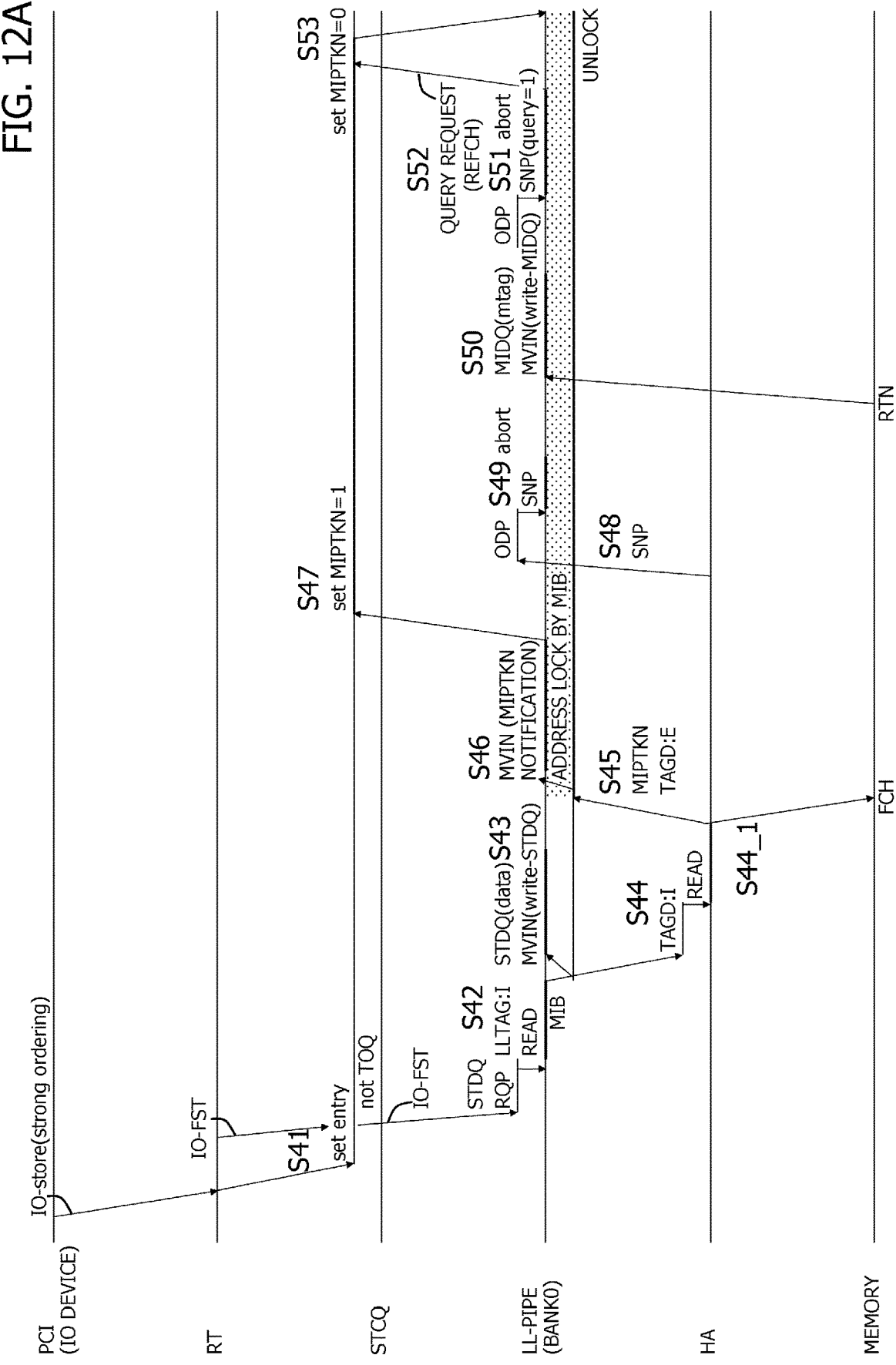
FIGS. 12A and 12B are diagrams indicating a sequence chart of Operation Example 5 of the IO store request with order guarantee.
Figure 12B:
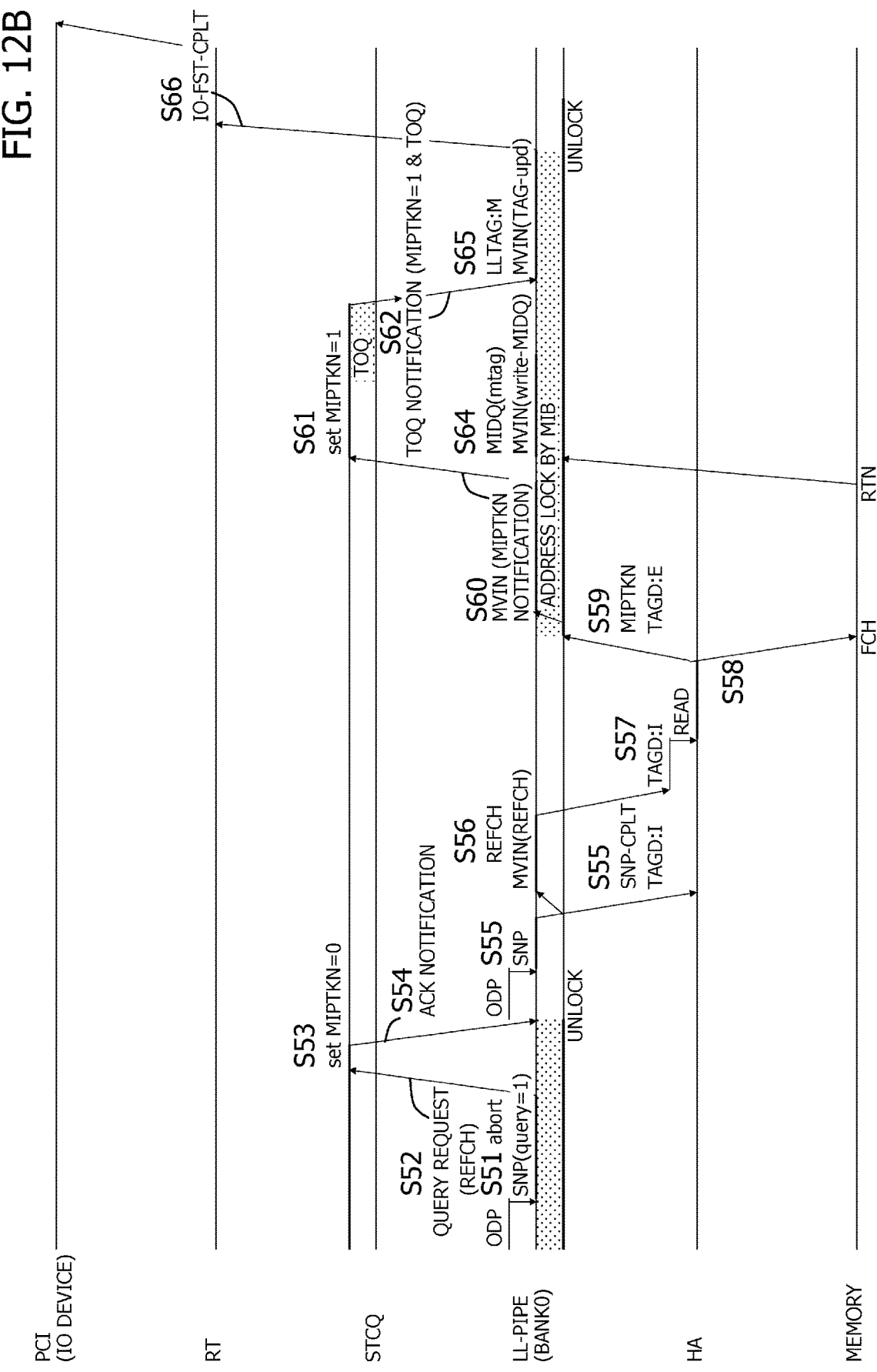

FIGS. 12A and 12B are diagrams indicating a sequence chart of Operation Example 5 of the IO store request with order guarantee. Operation Example 5 is an example of preventing a hang up of the system in the following dead lock state.

FIG. 13 indicates the dead lock state in Operation Example 5. As indicated in the entry queue register ENTRY_QUE_REG of the store command queue, for the IO store requests C and D in the entry, the data ownership has been already acquired (MIPTKN=1), hence the addresses C and D in the IO store request are currently locked. The IO store request B, which was entered before the IO store requests C and D, is in the state of waiting for the data ownership acquisition notification (MIPTKN=0). On the other hand, snoop requests are inputted for the addresses C and D from the other core group, and are stored in the order port ODP occupying all two resource of the order port ODP. The order port ODP is connected with the home agent HA and the router RT via an order virtual channel ODR_VC, so that the snoop request from the other core group and the data ownership acquisition notification from the home agent HA reach the order port ODP via the order virtual channel.

In the above state, (1) addresses C and D are currently locked in the LL-PIPE, hence the snoop requests to acquire the data ownership at the addresses C and D are continuously aborted in the LL-PIPE. Normally when a request or an order is aborted, the request or the order is returned to the input port (order port or request port), and is re-entered in the LL-PIPE after a predetermined time elapses. (2) when the address lock is released, the snoop request is processed in the LL-PIPE. However, the data ownership acquisition flag of the IO store request B is MIPTKN=0, hence the entries C and D are unable to be the top-of-queue, and the address lock for C and D is not released. (3) When the entry B becomes MIPTKN=1, the entries C and D eventually become a top-of-queue and address lock for C and D is released. However, the snoop request SNOOP currently occupies all the resource of the order port ODP, hence the entry B is unable to receive the data ownership acquisition notification MIPTKN, and MIPTKN=1 does not occur. (4) When the processing of the snoop request completes, the resource of the order port is released, and the entry B is able to receive the data ownership acquisition notification. However, the snoop request is continuously aborted as described in (1). This is the dead lock state. Since the processing of the IO store request is started speculatively when receiving the IO store requests according to the present embodiment, therefore in the case where the order of the data ownership acquisition is different from the order of receiving the IO store request, this lock state occurs, and throughput drops.

In Operation Example 5 indicated in FIGS. 12A and 12B, in the case where the snoop request SNP is aborted, the LL cache control unit temporarily releases the address lock due to the entries C and D only under the condition that ALL_MIPTKN_TO_TOQ=0, thereby completes the processing of the snoop request for the address C and D. Then the data ownership is re-acquired by the entries C and D. The data ownership is re-acquired by the move in control unit entering the refetch request MVIN (REFCH) to the LL-PIPE.

Operation Example 5 will be described with specifics. In FIG. 12A, when the IO store request with order guarantee, issued by the IO device, reaches the store command queue STCQ via the router RT, the store command queue STCQ enters this IO store request to the entry queue register ENTRY_QUE_REG (S41). Further, responding to the IO store request, the router RT issues the full store request IO-FST to the LL cache control unit, and the LL cache control unit stores the full store request in the request port RQP, and the store data is stored in the store data queue STDQ. When a read request READ is entered from the request port RQP to the LL-PIPE, the LL-PIPE detects that the LL tag is LLTAG: I (data is not owned) (S42). Hence, the LL-PIPE issues the read request READ to the home agent HA, and at the same time the move in control unit MIB enters MVIN (write-STDQ) to the LL-PIPE, then the LL-PIPE writes the data in the store data queue STDQ in the data RAM (S43).

When the read request READ is received, the home agent HA detects TAGD: I (data is not owned) of the tag directory (S44), hence issues a fetch request to the memory (S44_1), and at the same time, the home agent HA updates the tag directory to TAGD: E, and responds with the data ownership acquisition notification MIPTKN to the LL cache control unit (S45).

In the LL cache control unit, the move in control unit MIB locks the address of the IO request, enters MVIN (MIPTKN notification) to the LL-PIPE, and the LL-PIPE issues the MIPTKN notification to the store command queue STCQ (S46). Responding to this MIPTKN notification, the store command queue STCQ sets the data ownership acquisition flag MIPTKN of the entry to "1" (S47).

In Operation Example 5, it is assumed that the above operation was performed for the IO store request C and D, and the store command queue STCQ is in a state of FIG. 13. Here, the other core group CMG issues two snoop requests SNP to acquire the data ownership of the addresses C and D corresponding to the entries C and D, and these snoop requests SNP reach from the home agent HA to the order port ODP of the LL cache control unit (S48). As a result, all the resources are occupied in the order port ODP, as indicated in FIG. 13. Thereby the above-mentioned dead lock state occurs. In FIG. 12A, only one snoop request SNP (S48) is indicated, but it is assumed that two snoop requests SNP for addresses C and D reach from the home agent HA to the order port ODP of the LL cache control unit, and the following processing is performed Since the entries C and D are MIPTKN=1, the addresses C and D are in the address lock state. Therefore, the snoop requests SNP for the addresses C and D entered to the LL-PIPE are aborted, and remain in the order port ODP (S49). At this timing, in the example in FIG. 12A, the fetch request (S44_1) is responded to, and the memory tag is stored in the move in data queue MIDQ. Then the move in control unit MIB enters MVIN (write-MIDQ) to the L-PIPE and registers the memory tag mtag in the data RAM (S50).

Therefore in order to resolve the dead lock state, a snoop request SNP (query=1) of which query attribute is "1" is entered to the LL-PIPE as the second snoop request (S51). By this entry, the LL-PIPE aborts the snoop request by an address lock, and issues a query request, to check whether the prefetch issuing condition is satisfied or not, to the store command queue STCQ (S52).

When the store command queue STCQ in FIG. 5 receives the query request P_BKO_QUERY_VAL_STCQ=1 and the request ID P_BKO_REQ_ID_STCQ, the match determination circuit MCH_JDG determines whether the REQ_ID of the query and the REQ_ID of the entry match. Further, the calculation circuit ALL_MIPTKN_TOTOQ_CAL performs a logical operation of ALL_MIPTKN_TOTOQ to determine whether all the MIPTKNs are 1 from the TOQ entry to the matched entries C and D. Then in the case where all the MIPTKNs are not 1 (ALL_MIPTKN_TO_TO=0), the query request processing unit QUERY_REQ_PRC updates the MIPTKNs of the matched entries C and D to MIPTKN=0 (S53), and issues an ACK response arbitration participation P_ACK_VOTE_VAL=1. The ACK/TOQ arbitration unit ACK/TOQ_ARB selects the ACK notification without conditions, and the LL$ responding unit LL$_RES responds with an ACK notification (P_BK(0|1)_STCQ_ACK_VAL=1, P_BK(0|1)_STCQ_REQ_ID) to the LL cache control unit (S54). In the case where all the MIPTKNs are 1 (ALL_MIPTKN_TO_TO=1), the query request processing unit QUERY_REQ_PRC stands by and performs no operation.

When the ACK notification is received, the LL-PIPE of the LL cache control unit release the address lock of the addresses C and D, processes the re-entered snoop requests SNP, and issues the snoop completion notification SNP-CPLT to the home agent HA (S55). Responding to this, HA updates the tag directories TAGD of the addresses C and D to TAGD: I, thereby abandons the data ownership. In this flow, the tag directories are already TAGD: I, hence there is no need to write back the data in the LL cache to the memory. Further, the address lock of the addresses C and D is released, but the LL tag is still LLTAG: I, hence even if the read requests for the addresses C and D are issued at this timing, the "data before storing" in the memory is read.

Thus the snoop requests for the addresses C and D are completed, and hereafter the resources occupied by the snoop requests in the order port ODP are released, and the order port is able to receive the MIPTKN notification. Therefore the MIPTKN notification of address B (not indicated) that comes next is received by the order port ODP, and the MIPTKN flag of the entry B in the store command queue STCQ is updated to MIPTKN=1. When the snoop request for either one of the addresses C and D is completed, one resource of the order port ODP is released, and the MIPTKN notification is able to be received.

At the same time with issuing SNP-CPLT, the move in control unit enters the refetch request MVIN (REFCH) of the addresses C and D to the LL-PIPE, and the LL-PIPE issues the refetch request REFCH to the home agent HA (S56). HA issues the fetch request FCH to the memory since TAGD: I (S58), updates TAGD: I to TAGD: E, and responds with the data ownership acquisition notification MIPTKN to the LL cache control unit (S59). Then the move in control unit MIB Locks the addresses C and D, enters MVIN (MIPTKN notification) to LL-PIPE, and the LL-PIPE issues the data ownership acquisition notification MIPTKN to the store command queue STCQ (S60).

Operations S61 to S66 hereafter are the same as SA7 to SA10 or SB7 to SB10 in FIG. 8. The entry B before the entries C and D was MIPTKN=1, hence the entries C and D became the top-of-queue TOQ, the TOQ notification is issued from the store command queue STCQ, and the cache injection processing of the IO store request for the entries C and D completes.

The Operation Example 5 is for the IO store request with valid memory tag attribute, but in the case of the IO store request with invalid memory tag attribute, the processing steps S44_1, S50, S58 and S64 are not executed, and the rest is the same as the case described in Operation Example, as indicated in FIG. 8.

As described above, in Operation Example 5, the MIPTKN flags of the entries C and D are set to MIPTKN=0 first to release the address lock, by which the processing of the snoop requests for the addresses C and D is completed, and the dead lock state is released. As a result, a drop in throughput of the IO store request processing with order guarantee, due to the dead lock state caused by the store command queue STCQ, is able to be minimized.

Operation Example 6 of IO Store Request with Order Guarantee (Mtag Valid, IO-FST, LLTAG=E or M)

Figure 14A:
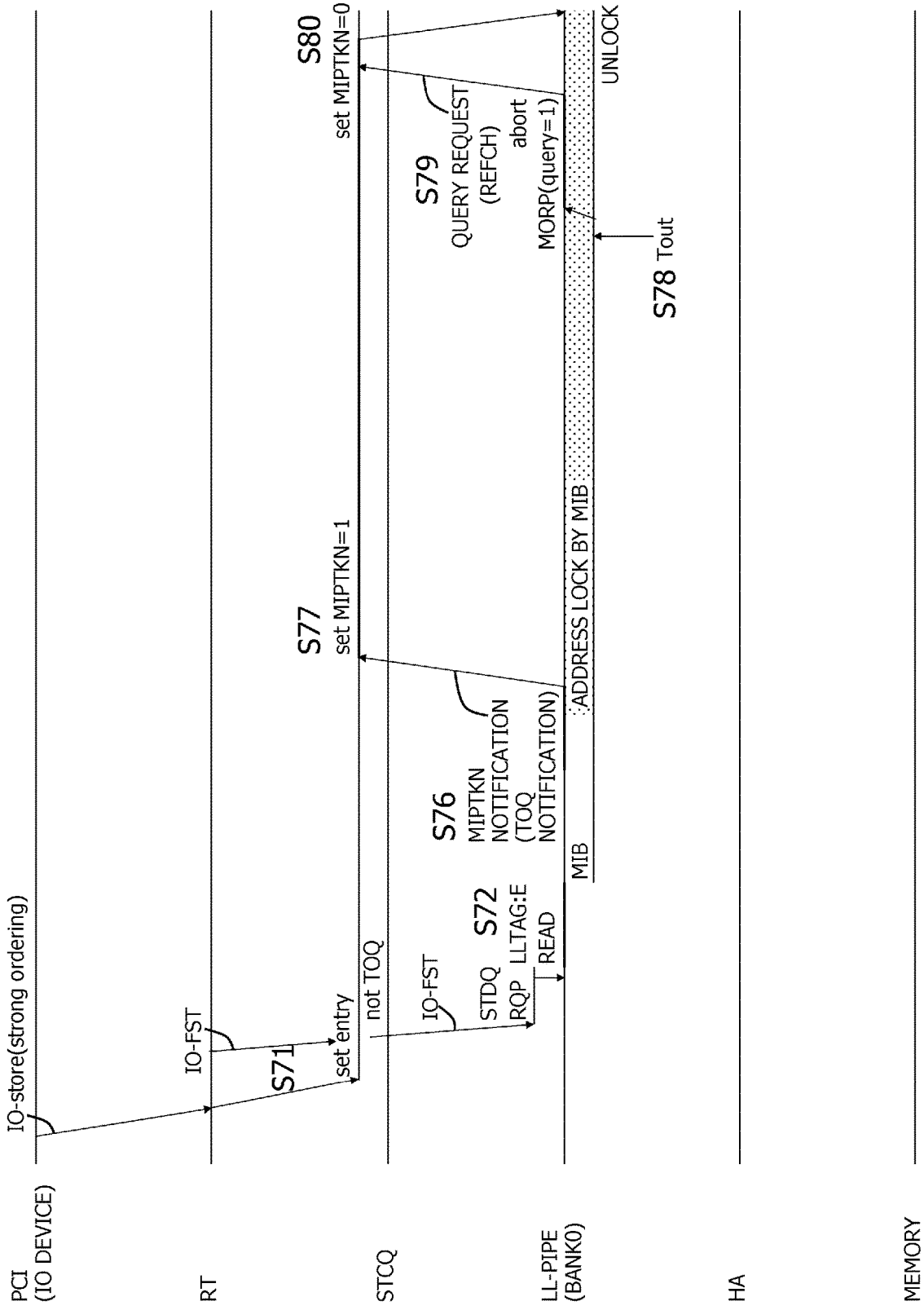
FIGS. 14A and 14B are diagrams indicating a sequence chart of Operation Example 6 of the IO store request with order guarantee.
Figure 14B:
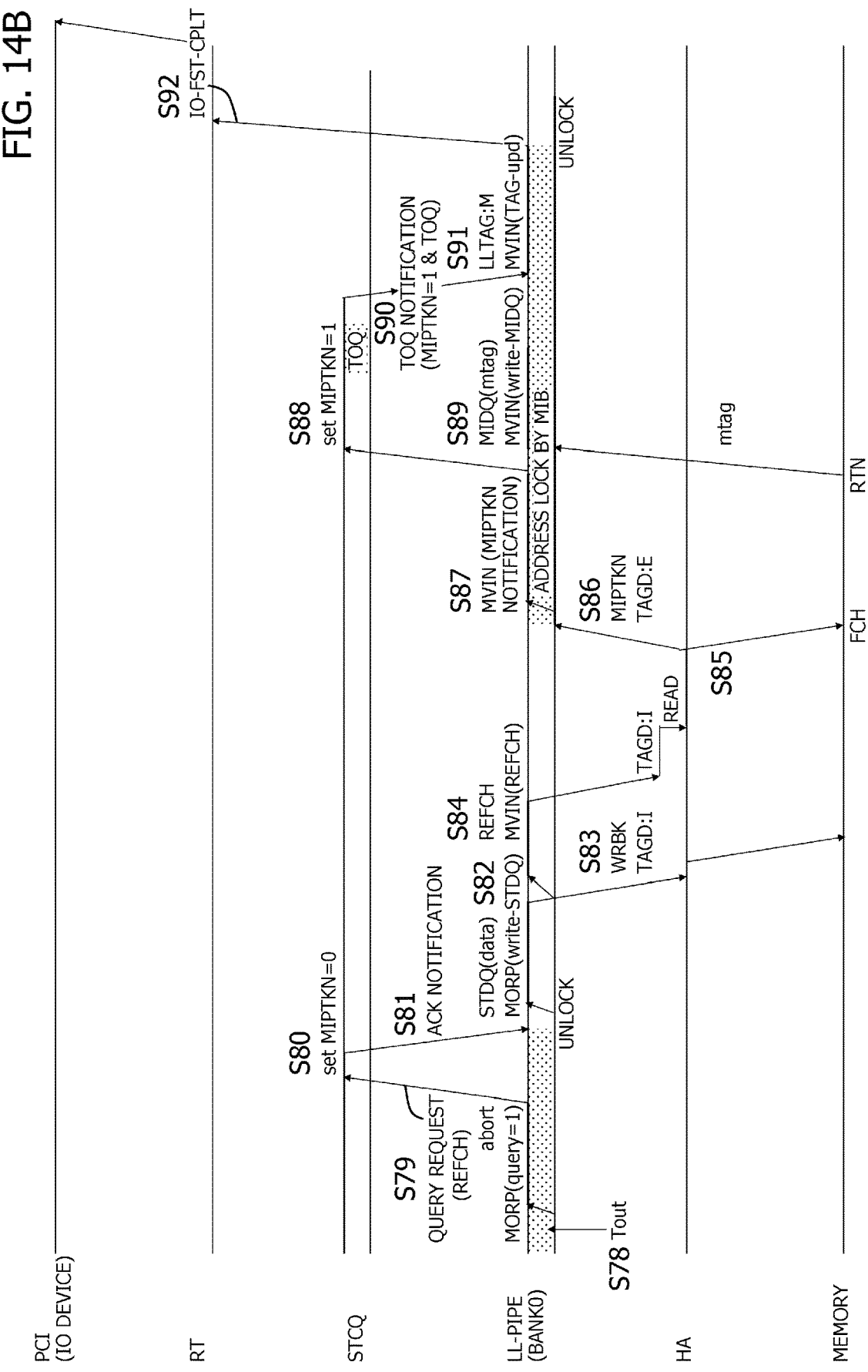

FIGS. 14A and 14B are diagrams indicating a sequence chart of Operation Example 6 of the IO store request with order guarantee.

Figure 15:
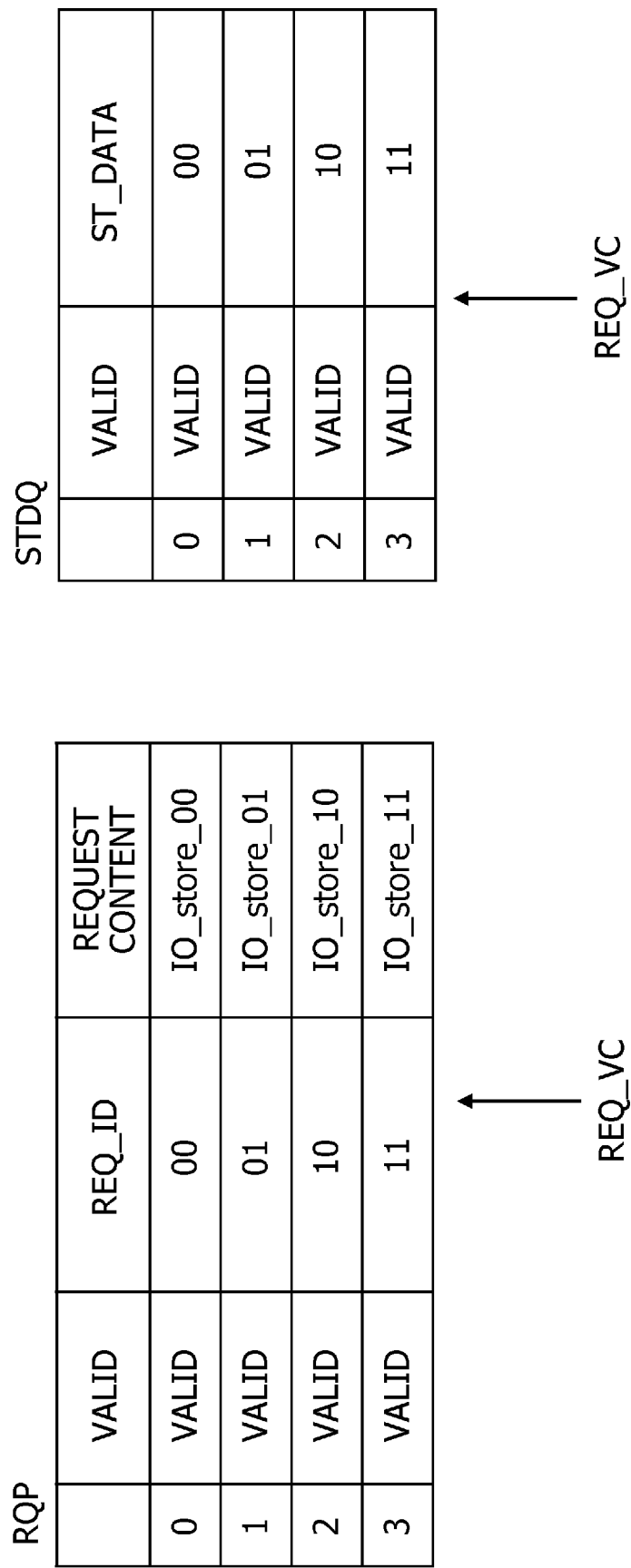
FIG. 15 indicates a configuration example of the request port RQP and the store data queue STDQ of the LL cache control unit according to Operation Example 6.

FIG. 15 indicates a configuration example of the request port RQP and the store data queue STDQ of the LL cache control unit according to Operation Example 6. In the request port RQP, a valid bit VALID, a request ID (REQ_ID)

and request content are stored, and a valid bit VALID and data to be stored ST_DATA are stored in a store data queue STDQ. These queues are linked by the same indices. In the example in FIG. 15, each queue has four resources. An IO store request and data are sent to each of the queues from the router RT via a request virtual channel REQ_VC.

As a prerequisite, the IO store request issued by the IO device and data are stored as a pair in the request port RQP and the store data queue STDQ of the LL cache control unit. When the data in the store data queue STDQ is written in the data RAM of the LL cache, the resources of RQP and STDQ are released.

In Operation Example 6, the LL tag LLTAG is E or M, hence the data ownership has been obtained in the same manner as FIG. 9. In this case, just like S29 in FIG. 9, the store data in the store data queue STDQ is not written in the data RAM of the LL cache until the TOQ notification is received. This means that the resources of RQP and STDQ are continuously occupied until the TOQ notification is received from the store command queue STCQ. When the maximum number of resources MAX are occupied like this, a new IO store request is not able to be received, and throughput of the IO store request processing drops.

This state in Operation Example 6 is not like the dead lock state in Operation Example 5, hence the resources of RQP and STDQ are released as time elapses. However, IO store request issue performance still drops if reception of a new IO store request is disabled for a predetermined time or more.

Therefore in Operation Example 6, when the TOQ notification wait state continues for a predetermined time or more, and a time out occurs, the LL cache control unit executes a move out and replace processing, where the "data before storing" in the data RAM of the LL cache of the timed out entry is written back to the memory, and the "data after storing" in the store data queue STDQ is written in the data RAM. Thereby the resources of the store data queue STDQ and the resources of the request port RQP are released, and a drop in throughput is alleviated.

In Operation Example 6, the move out and replace processing is executed not only when a time out occurs, but also when it is not true that all the MIPTKN flags from the time out entry to the entry of TOQ are 1 (ALL_MIPTKN_TO_TOQ=0). In the case of satisfying ALL_MIPTKN_TO_TOQ=0, it is expected that it will take a long time until the TOQ notification of the entry is received, hence the move out and replace processing is able to be executed appropriately in a case where throughput is more likely to drop.

Operation Example 6 will be described with reference to FIGS. 14A and 14B. When an IO store request with order guarantee issued by the IO device reaches the store command queue STCQ via the router RT, the STCQ enters the IO store request to the entry queue register (S71). On the other hand, an IO full store request IO-FST, which the router RT issued responding to the reception of the IO store request and data thereof, are stored in the request port RQP and the store data queue STDQ of the LL cache control unit. Then the LL-PIPE, which executes a read request READ entered from the request port RQP, detects LLTAG: E, thereby recognizes that data ownership at the address of the IO store request has already been acquired (S72). This means that the "data before storing" is already stored in the data RAM DATA-RAM, hence the data in the store data queue STDQ is not written in the data RAM DATA-RAM. This is because in order to write data in the data RAM, the "data after storing" in the data RAM has to be written back to the memory, and it is more efficient to directly overwrite the data in the data RAM with the data of the IO store request without performing a write back.

Therefore the move in control unit locks the address of the IO store request, and issues a data ownership acquisition notification MIPTKN to the store command queue STCQ (S76). Then the IO store request becomes a state of the LL pipeline being waiting for the TOQ notification from the store command queue STCQ.

However, the TOQ notification wait state continues for a predetermined time or more, and a time out Tout occurs (S78). Here it is suspected that all the resources of the store data queue STDQ are already occupied or will become occupied, and the reception of a new IO store request is disabled.

Therefore responding to the time out, the move in control unit MIB issues a move out and replace request with query attribute MORP (query=1) to the LL-PIPE (S79). This move out and replace request MORP is aborted, and the LL-PIPE issues a query request (REFCH), to inquire whether the conditions for refetching are satisfied or not to the store command queue STCQ (S79).

Responding to the query request, the store command queue STCQ performs the same processing as FIGS. 12A and 12B, and in the case of ALL_MIPTKN_TO_TOQ=0, the store command queue STCQ sets the MIPTKN flag of the entry of the query request to MIPTKN=0 (S80), and responds with an ACK notification to the LL cache control unit (S81).

Responding to this ACK notification, the move in control unit MIB unlocks the address lock and enters a move out and replace request MORP (write-STDQ) to the LL-PIPE (S82). Responding to this entry, the LL-PIPE issues a write back request WRBK to HA to write the "data before storing" in the data RAM DATA-RAM back to the memory (S83), and writes the data stored in the store data queue STDQ to the data RAM DATA-RAM. Responding to the write back request WRBK, the home agent HA sets the tag directory TAGD to TAGD: I, and writes the "data before storing" back to the memory.

When the data stored in the store data queue STDQ is written to the data RAM DATA-RAM, the resource in the store data queue STDQ is released. Since this release of the resource was scheduled after receiving TOQ, the resource is released sooner than scheduled, and a new IO store request is able to be received, thereby a drop in throughput is able to be minimized.

The move in control unit MIB further enters MVIN (REFCH) to the LL-PIPE. Responding to this entry, the LL-PIPE issues a refetch request REFCH to the home agent HA (S84), and HA confirms the tag directory TAGD: I, issues a data ownership acquisition notification MIPTKN to the LL cache control unit, and updates the tag directory TAGD to TAGD: E (S86). Furthermore, HA issues a read request READ to the memory to read the memory tag (S85). The processing steps S87 to S92 thereafter are the same as the processing steps S60 to S66 in FIG. 12B.

In Operation Example 6, in the case where the IO store request with memory tag being invalid, the home agent HA does not issue the read request READ to the memory.

As described above, the CPU chip of the present embodiment has the store command queue STCQ. The store command queue STCQ enters the IO store request with order guarantees in order of reception, and the LL cache control unit speculatively executes the cache injection of the IO store request. Then the LL cache control unit notifies the store command queue STCQ that the data ownership of the address of the IO store request is acquired, and the store command queue STCQ notifies the TOQ notification to the LL cache control unit in order from the entry of the top-of-queue among the entries that acquired data ownership. Responding to this TOQ notification, the LL cache control unit updates the state of LLTAG corresponding to the TOQ entry to Modify, and issues the completion notification for the IO store request to the IO device. Thereby the IO device is able to be improved throughput of issuing IO store requests with order guarantees.

According to the first aspect, the throughput that the IO device issues the IO request with order guarantee is able to be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processor comprising:
    a plurality of core groups each of which includes a plurality of cores and a cache unit shared by the plurality of cores;
    a plurality of home agents which belong to the plurality of core groups respectively, and each of which includes a tag directory configured to store ownership information of the plurality of core groups relating to data in memories, which belong to the plurality of core groups respectively; and
    a store command queue which includes an entry queue configured to enter a store request with order guarantee, received from an input/output device, in order of reception, wherein
    the cache unit includes a data RAM that stores data, a cache tag that stores a state of data in the data RAM, and a cache control unit, and
    responding to reception of the store request with order guarantee,
    (a) the store command queue enters the received store request to the entry queue in order of reception,
    (b) the cache control unit checks the cache tag, and in a case where an address of the received store request is not registered in the data RAM, the cache control unit stores the data of the store request in the data RAM, and issues a data ownership acquisition request to the home agent to request to acquire data ownership of an address of the store request,
    (c) the home agent checks the tag directory in response to the data ownership acquisition request, and in a case where the data ownership is acquired, the home agent responds with a data ownership acquisition notification to the cache control unit of the request source,
    (d) in response to the data ownership acquisition notification, the cache control unit sends the data ownership acquisition notification to the store command queue, and sets an address lock to disable access to the address of the store request,
    (e) in response to the data ownership acquisition notification, the store command queue sets a data ownership acquisition flag of the store request, corresponding to the data ownership acquisition notification, to valid,
    (f) the store command queue issues a top-of-queue notification to the cache control unit, for a store request which is in a top-of-queue entered earliest in the entry queue, and of which data ownership acquisition flag is valid, and deletes the entry of the store request of the top-of-queue, and
    (g) in response to the top-of-queue notification, the cache control unit updates the cache tag to a modified state, issues a store request completion notification to an input/output device, and releases the address lock.

2. The arithmetic processor according to claim 1, wherein
    (c1) in addition to the processing in the (c), in a case where the tag directory is in the invalid state which indicates that the data in the memory at the address of the store request has not been taken out to a cache of another core group, the home agent changes the tag directory from the invalid state to an exclusive state which is a state owned by the cache of a local core group.

3. The arithmetic processor according to claim 1, wherein
    (c2) in addition to the processing in the (c), in a case where the tag directory is in a state which indicates that the data in the memory at the address of the store request has been taken out to a cache of another core group, the home agent requests the cache of the other core group to abandon the ownership of the taken-out data, and in response to a response of abandoning the taken-out data, the home agent changes the tag directory to the exclusive state.

4. The arithmetic processor according to claim 1, wherein
    in response to the reception of the store request with order guarantee,
    (b1) in a case where the cache control unit checks the cache tag and finds out that data of the address of the received store request is currently registered in the data RAM, the cache control unit sets address lock to disable access to the address of the store request, and sends the data ownership acquisition notification to the store command queue,
    (e1) the store command queue executes the processing in the (e),
    (f1) the store command queue executes the processing in the (f), and
    (g1) in response to the top-of-queue notification, the cache control unit overwrites the data of the store request in the data RAM, updates the cache tag to the modified state, issues a store request completion notification to the input/output device, and release the address lock.

5. The arithmetic processor according to claim 1, wherein
    in a case where the store request with order guarantee needs to store the tag information of data in the memory,
    (c3) the home agent further issues a fetch request to fetch the tag information of the address of the store request to the memory in the processing in the (c), and
    (h) when a response of tag information to the fetch request is received after the processing in the (d), the cache control unit registers the tag information in the data RAM.

6. The arithmetic processor according to claim 1, wherein
    in a case where the store request with order guarantee is a partial store request which has a partial data of the store request,
    (c4) the home agent further issues a fetch request to fetch remaining data of the store request to the memory in the processing in the (c), and
    (h) when a response of data to the fetch request is received after the processing in the (d), the cache control unit registers the responded data in the data RAM.

7. The arithmetic processor according to claim 1, wherein
(i) after the processing in the (e), the cache control unit, in a case where there is a store request of which data ownership acquisition flag is invalid in the entry queue from the store request having the locked address, which is set to address lock, to the store request of the top-of-queue, issues a query request to invalidate the data ownership acquisition flag of the store request having the locked address to the store command queue, in response to the snoop request (M0C0) to request abandoning the data ownership of the locked address, and in response to the acknowledgment notification to notify completion of the processing of the query request from the store command queue, the cache control unit releases the address lock of the locked address, causes the home agent to invalidate the data ownership state of the locked address in the tag directory, and issues the data ownership acquisition request to the home agent.

8. The arithmetic processor according to claim 1, wherein
in response to the reception of the store request with order guarantee,
(b1) in a case where the address of the received store request is currently registered in the data RAM, the cache control unit sets an address lock to disable access to the address of the store request, and sends the data ownership acquisition notification to the store command queue,
(e1) the store command queue executes the processing in the (e),
(i) when a time out occurred in a wait state for a top-of-queue notification which responded to the data ownership acquisition notification, the cache control unit issues to the store command queue a query request to invalidate the data ownership acquisition flag of the store request having the locked address, in a case where there is a store request, of which data ownership acquisition flag is invalid, in the entry queue from the store request having the currently locked address to the store request of the top-of-queue, and in response to an acknowledgement notification to notify completion of the processing of the query request from the store command queue, the cache control unit releases the address lock of the currently locked address, causes the home agent to write back the data currently registered in the data RAM to the memory and invalidate the data ownership state of the currently locked address in the tag directory, and issues the data ownership acquisition request to the home agent.

9. A method of processing by an arithmetic processor comprising:
the arithmetic processor including,
a plurality of core groups each of which includes a plurality of cores and a cache unit shared by the plurality of cores;

a plurality of home agents which belong to the plurality of core groups respectively, and each of which includes a tag directory configured to store ownership information of the plurality of core groups relating to data in memories, which belong to the plurality of core groups respectively; and a store command queue which includes an entry queue configured to enter a store request with order guarantee, received from an input/output device, in order of reception, wherein the cache unit includes a data RAM that stores data, a cache tag that stores a state of data in the data RAM, and a cache control unit, and the method comprising:
responding to reception of the store request with order guarantee,
(a) entering, by the store command queue, the received store request to the entry queue in order of reception,
(b) checking, by the cache control unit, the cache tag, and in a case where an address of the received store request is not registered in the data RAM, storing, by the cache control unit, the data of the store request in the data RAM, and issuing a data ownership acquisition request to the home agent to request to acquire data ownership of an address of the store request,
(c) checking, by the home agent, the tag directory in response to the data ownership acquisition request, and in a case where the data ownership is acquired, responding, by the home agent, with a data ownership acquisition notification to the cache control unit of the request source,
(d) in response to the data ownership acquisition notification, sending, by the cache control unit, the data ownership acquisition notification to the store command queue, and setting an address lock to disable access to the address of the store request,
(e) in response to the data ownership acquisition notification, setting, by the store command queue, a data ownership acquisition flag of the store request, corresponding to the data ownership acquisition notification, to valid,
(f) issuing, by the store command queue, a top-of-queue notification to the cache control unit, for a store request which is in a top-of-queue entered earliest in the entry queue, and of which data ownership acquisition flag is valid, and deleting the entry of the store request of the top-of-queue, and
(g) in response to the top-of-queue notification, updating, by the cache control unit, the cache tag to a modified state, issuing a store request completion notification to an input/output device, and releasing the address lock.

* * * * *